(12) United States Patent
Cox et al.

(10) Patent No.: US 11,106,694 B1
(45) Date of Patent: Aug. 31, 2021

(54) COMPUTERIZED PIPELINES FOR TRANSFORMING INPUT DATA INTO DATA STRUCTURES COMPATIBLE WITH MODELS

(71) Applicant: SAS Institute Inc., Cary, NC (US)

(72) Inventors: James Allen Cox, Cary, NC (US); Nancy Anne Rausch, Cary, NC (US)

(73) Assignee: SAS INSTITUTE INC., Cary, NC (US)

(*) Notice: Subject to any disclaimer, the term of this patent is extended or adjusted under 35 U.S.C. 154(b) by 0 days.

(21) Appl. No.: 17/173,308

(22) Filed: Feb. 11, 2021

Related U.S. Application Data

(60) Provisional application No. 62/979,686, filed on Feb. 21, 2020, provisional application No. 62/984,385, filed on Mar. 3, 2020.

(51) Int. Cl.
*G06F 16/25* (2019.01)
*G06N 3/04* (2006.01)
*G06N 3/08* (2006.01)

(52) U.S. Cl.
CPC ......... *G06F 16/258* (2019.01); *G06N 3/0445* (2013.01); *G06N 3/084* (2013.01)

(58) Field of Classification Search
CPC ..... G06F 16/258; G06N 3/0445; G06N 3/084
See application file for complete search history.

(56) References Cited

U.S. PATENT DOCUMENTS

| | | | | |
|---|---|---|---|---|
| 2018/0293462 | A1* | 10/2018 | Ambati | G06N 5/022 |
| 2019/0043239 | A1* | 2/2019 | Goel | G10L 19/00 |
| 2019/0340542 | A1* | 11/2019 | Wu | G06N 20/00 |

OTHER PUBLICATIONS

Branco et al., "A Survey of Predictive Modelling under Imbalanced Distributions", pp. 1-48 (2015).
Codd, "A Relational Model of Data for Large Shared Data Banks", Communications of the ACM, vol. 13, No. 6, pp. 377-387 (1970).
Kent, "A Simple Guide to Five Normal Forms in Relational Database Theory", Communications of the ACM, vol. 26, No. 2, pp. 120-125 (1983).
van der Maaten et al., "Visualizing Data using t-SNE", Journal of Machine Learning Research, vol. 9, pp. 2579-2605 (2008).
Ruiz, "The 80/20 data science dilemma", The Cognitive Coder, 4 pages (2017).

* cited by examiner

*Primary Examiner* — Etienne P Leroux
(74) *Attorney, Agent, or Firm* — Kilpatrick Townsend & Stockton LLP

(57) ABSTRACT

Computerized pipelines can transform input data into data structures compatible with models in some examples. In one such example, a system can obtain a first table that includes first data referencing a set of subjects. The system can then execute a sequence of processing operations on the first data in a particular order defined by a data-processing pipeline to modify an analysis table to include features associated with the set of subjects. Executing each respective processing operation in the sequence to generate the modified analysis table may involve: deriving a respective set of features from the first data by executing a respective feature-extraction operation on the first data; and adding the respective set of features to the analysis table. The system may then execute a predictive model on the modified analysis table for generating a predicted value based on the modified analysis table.

30 Claims, 19 Drawing Sheets

COMPUTERIZED PIPELINES FOR TRANSFORMING INPUT DATA INTO DATA STRUCTURES COMPATIBLE WITH MODELS

REFERENCE TO RELATED APPLICATION

This claims the benefit of priority under 35 U.S.C. § 119(e) to U.S. Provisional Patent Application No. 62/979,686, filed Feb. 21, 2020, and to U.S. Provisional Patent Application No. 62/984,385, filed Mar. 3, 2020, the entirety of each of which is hereby incorporated by reference herein.

TECHNICAL FIELD

The present disclosure relates generally to data-processing pipelines. More specifically, but not by way of limitation, this disclosure relates to computerized pipelines for transforming input data into data structures such as analysis tables compatible with predictive models and other models.

BACKGROUND

In database theory, it is generally desirable to normalize data and link data tables together through a series of keys. In particular, data tables are often linked by primary and secondary keys, so that data redundancy and dependency is minimized. While spreading data across a multitude of key-linked data tables yields several advantages in the context of building relational databases, that arrangement of data can be unsuitable in other contexts, such as in the context of predictive modelling.

Predictive modelling generally involves using machine-learning models (e.g., neural networks, classifiers, etc.) or other types of models to predict a future value. Predictive models often require their input data to be de-normalized and formatted in certain ways, for example with all relevant information stored in a single data table in which each column corresponds to a unique variable and each row corresponds to an individual observation. Data tables that are properly formatted for use with predictive models can be referred to as Analytical Base Tables (ABTs) or analysis tables. Generating an analysis table can involve selecting and rearranging data from multiple key-linked data tables to make the data suitable for use with a predictive model. This is often a manual process that can be complex, subjective, tedious, and error prone. For example, a data scientist may manually comb through thousands or millions of rows of data in key-linked data tables to determine which information to extract. Next, the data scientist determines how to format that information in a way that is compatible with the particular predictive model. The data scientist then creates the analysis table with the formatted information for use with the predictive model. Not only is this process subjective and complex, but it is also exceedingly slow. It is common for such data-preparation processes to take up a significant proportion of a data scientist's time when performing predictive analysis. For example, some estimates indicate that only 20% of a data scientist's time is spent performing the desired analysis while 80% of their time is spent on finding, organizing data, and preparing the data.

SUMMARY

One example of the present disclosure can include a system comprising one or more processing devices and one or more memory devices. The one or more memory devices can include instructions that are executable by the one or more processing devices for causing the one or more processing devices to perform operations. The operations can include obtaining a first table that includes first data referencing a set of subjects, wherein each subject in the set of subjects is correlated in the first data to one or more variable values describing a transaction associated with the subject, and wherein the first data includes at least one one-to-many relationship in which a subject in the set of subjects is referenced in multiple observations. The operations can include obtaining second data referencing the set of subjects, wherein each subject in the set of subjects is correlated in the second data to one or more attributes describing the subject. The operations can include generating an analysis table based on the second data, the analysis table being separate from the first table. The operations can include executing a sequence of processing operations on the first data in a particular order defined by a data-processing pipeline to modify the analysis table to include features associated with the set of subjects. Executing each respective processing operation in the sequence to generate the modified analysis table can involve: deriving a respective set of features from the first data by executing a respective feature-extraction operation on the first data; and adding the respective set of features to the analysis table, such that each subject in the set of subjects is correlated in the analysis table to corresponding values for the respective set of features. The operations can include executing a predictive model on the modified analysis table for generating a predicted value based on the modified analysis table.

Another example of the present disclosure can include a method involving obtaining a first table that includes first data referencing a set of subjects, wherein each subject in the set of subjects is correlated in the first data to one or more variable values describing a transaction associated with the subject, and wherein the first data includes at least one one-to-many relationship in which a subject in the set of subjects is referenced in multiple observations. The method can also include obtaining second data referencing the set of subjects, wherein each subject in the set of subjects is correlated in the second data to one or more attributes describing the subject. The operations can include generating an analysis table based on the second data, the analysis table being separate from the first table. The method can also include executing a sequence of processing operations on the first data in a particular order defined by a data-processing pipeline to modify the analysis table to include features associated with the set of subjects. Executing each respective processing operation in the sequence to generate the modified analysis table can involve: deriving a respective set of features from the first data by executing a respective feature-extraction operation on the first data; and adding the respective set of features to the analysis table, such that each subject in the set of subjects is correlated in the analysis table to corresponding values for the respective set of features. The method can also include executing a predictive model on the modified analysis table for generating a predicted value based on the modified analysis table. Some or all of the method may be implemented by one or more processing devices.

Still another example of the present disclosure can include a non-transitory computer-readable medium comprising program code that is executable by one or more processing devices for causing the one or more processing devices to perform operations. The operations can include obtaining a first table that includes first data referencing a set of subjects, wherein each subject in the set of subjects is correlated in the first data to one or more variable values describing a transaction associated with the subject, and wherein the first data includes at least one one-to-many relationship in which a subject in the set of subjects is referenced in multiple observations. The operations can include obtaining second data referencing the set of subjects, wherein each subject in the set of subjects is correlated in the second data to one or more attributes describing the subject. The operations can include generating an analysis table based on the second data, the analysis table being separate from the first table. The operations can include executing a sequence of processing operations on the first data in a particular order defined by a data-processing pipeline to modify the analysis table to include features associated with the set of subjects. Executing each respective processing operation in the sequence to generate the modified analysis table can involve: deriving a respective set of features from the first data by executing a respective feature-extraction operation on the first data; and adding the respective set of features to the analysis table, such that each subject in the set of subjects is correlated in the analysis table to corresponding values for the respective set of features. The operations can include executing a predictive model on the modified analysis table for generating a predicted value based on the modified analysis table.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures.

Figure 1:
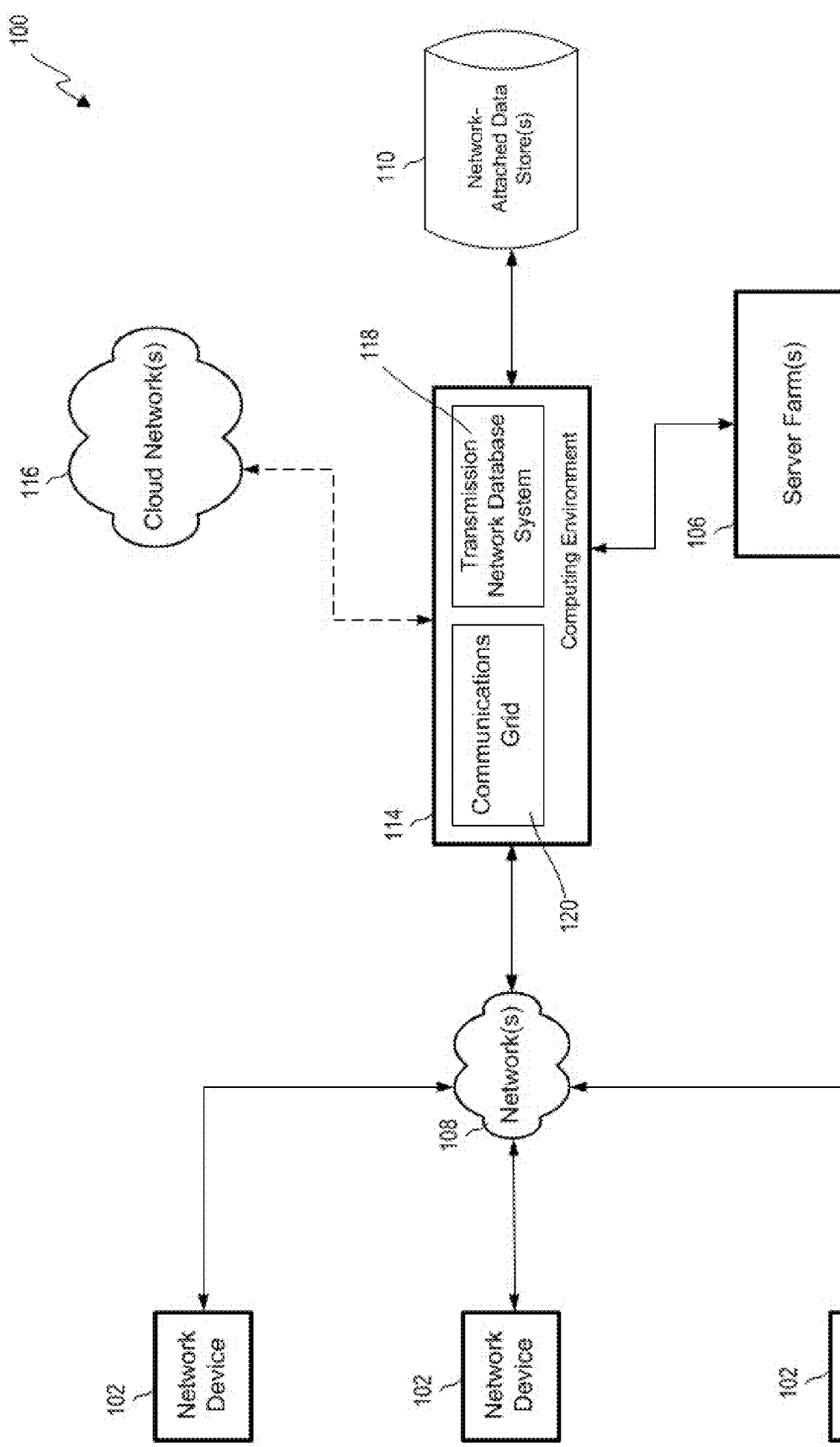
FIG. 1 depicts a block diagram of an example of a computing system according to some aspects.

In the appended figures, similar components or features can have the same reference label. Further, various components of the same type can be distinguished by following the reference label with a lowercase letter that distinguishes among the similar components. If only the first reference label is used in the specification, the description is applicable to any one of the similar components having the same first reference label irrespective of the lowercase letter.

DETAILED DESCRIPTION

Predictive models and other types of models are often configured to receive input data in a particular format. Examples of such input data can include one or more transactional tables, subject tables, and/or other tables, which may be in a database-normalized format that is different from the particular format expected by the predictive models. Input data that is not in that particular format expected by the predictive models may be incompatible with such models, causing the models to generate inaccurate results or malfunction. For example, many models are configured to operate on input data that is formatted such that a single row refers to a single subject, and consequently many predictive modeling toolkits generally assume that input data has this format. Such models are unable to properly handle input data in other formats, for example data that includes one-to-many relationships in which there are multiple observations (e.g., rows of data) involving a single subject in a data table. If a model is provided with input data that has such one-to-many relationships, the model may fail or provide inaccurate results. Additionally, the accuracy of a model depends on the amount, quality, and type of input data that is supplied. Supplying an insufficient amount of input data or the wrong types of input data can lead to poor results. To avoid these issues, data scientists are often called in to prepare data (e.g., raw data) for use with a model. But preparing data can be a complex, subjective, tedious, error-prone, and slow process. By some estimates, data scientists may even devote up to 80% of their time to manually studying the data, identifying relevant variables in the data, and properly formatting the relevant variables, in order to generate an analysis table that is compatible for use with a target model. Such analysis tables are often thousands or millions of rows long and dozens of columns wide, though their sizes can far exceed this amount.

As noted above, generating an analysis table for use with a target model can be difficult. An analysis table is a type of data structure such as a single data table that includes relevant information from input data. The input data may or may not be in the form of one or more data tables. The information in the analysis table can be formatted and arranged in a particular configuration that is compatible with a target model. Analysis tables may also include additional variables that are not present in the input data, but that are derived from the information in the input data, in an effort to improve the modelling results (e.g., the accuracy of an output from a model). These additional variables are typically determined and included in the analysis table by a data scientist after extensive study of the input data. Generating and including additional variables (e.g., from other complementary tables) into the analysis table can be another complex, slow, and error-prone process that places additional burdens on the data scientist.

Some examples of the present disclosure can overcome one or more of the abovementioned problems by generating a computerized data-processing pipeline for processing and transforming data into formats compatible with target models, such as predictive models and other models. The pipeline can include a sequence of processing operations configured to analyze an input data (e.g., raw data from one or more key-linked data tables) and generate an analysis table that is compatible with a target model based on the input data. Once the pipeline has been generated, a computer can execute the pipeline to automatically generate an analysis table that is compatible with the target model. This can significantly reduce the amount of the time, complexity, subjectivity, and errors associated with preparing big data for modelling.

At least one of the processing operations in the sequence can be configured to execute a feature-extraction operation on the input data for determining one or more variables of significance to the modelling process, and to incorporate values for the one or more determined variables into the analysis table. A feature-extraction operation is a computer operation for performing feature extraction. Feature extraction is a dimensionality reduction technique that involves deriving values ("features") from an initial dataset, such as from column values in a data table. The features may not be expressly included in the initial dataset, but rather may be derived from the initial dataset or from complementary data. Such feature-extraction operations may more rapidly and accurately identify relevant information to include in the analysis table, as compared to manual analysis by a data scientist.

In some examples, the pipeline may be manually generated by a user using pipeline-creation software. The pipeline-creation software can include a graphical user interface (GUI) with an extensible toolbox of processing operations that can be added to the pipeline in a desired order. For example, the toolbox may include a set of feature-extraction operations that can be drag-and-dropped onto a canvas of the GUI and arranged in a desired order to generate a pipeline. The processing operations may have certain default values and variables that can be further customized by the user, as desired. Once the pipeline is created, the user can execute the pipeline in the pipeline-creation software on input data, in order to transform the input data into an analysis table that is compatible with a target model.

In some examples, the pipeline-creation software can automatically generate the pipeline based on the characteristics of the input data. For example, the pipeline-creation software can analyze the characteristics of the input data to determine a set of processing operations to include in the pipeline and to determine an order to implement the set of processing operations. The pipeline-creation software can then generate the pipeline by organizing the set of processing operations in the determined order. The pipeline-creation software can output the automatically generated pipeline to the user in the GUI, so that the user can view the pipeline and either accept it as-is or make any desired customizations. For example, the user can customize the automatically generated pipeline by manually adding processing operations to the pipeline, removing processing operations from the pipeline, and/or reordering the processing operations in the pipeline. Once the user is finished customizing the pipeline, the user can execute the pipeline on an input data to generate a corresponding analysis table. In some examples, the user can iterate this process by repeatedly executing the pipeline and further refining (e.g., customizing) the pipeline based on the results thereof, to improve the pipeline over the course of multiple iterations.

The pipeline can include any number and combination of novel processing operations to generate an analysis table. For example, the input data can include categorical variables, represented by character strings, numbers, and/or symbols. It may be challenging to analyze categorical variables when they exist in a many-to-one relationship with a subject. So, the pipeline can include a processing operation configured to concatenate the categorical variables together into a single text string, converting them into a longer character string that contains all of the categorical data for each subject. The processing operation can then analyze the character string using analysis techniques typically reserved for unstructured text. This can be more efficient and effective than alternative approaches, such as "dummying" the variables whereby there is a single variable created for each categorical value. This may be particularly true when the categorical variables contain hundreds or thousands of different values.

In some examples, the pipeline-creation software can determine whether each processing operation in the pipeline is helpful to, harmful to, or extraneous to a modelling result and notify the user accordingly. For example, each processing operation in the pipeline can modify the analysis table in a particular manner, such as by including more information into the analysis table, removing existing information from the analysis table, or reformatting the information in the analysis table. After each processing operation modifies the analysis table, the pipeline-creation software can provide the modified analysis table as input to a target model and determine a resulting accuracy of the target model. The pipeline-creation software can then determine if the accuracy of the model increased, as compared to the accuracy of the model after the prior processing operation in the pipeline. If the accuracy of the model increased, the pipeline-creation software can determine that the current processing operation is a helpful processing operation that improves the modelling result. If the accuracy of the model decreased, the pipeline-creation software can determine that the current processing operation is a harmful processing operation that is detrimental to the modelling result. If the accuracy of the model stayed substantially the same (e.g., within a preset tolerance range) the pipeline-creation software can determine that the processing operation is an extraneous processing operation that has little or no impact on the modelling result. The pipeline-creation software can notify the user of whether each processing operation in the pipeline helps, harms, or is extraneous to the modelling result, so that the user can modify the pipeline as desired.

For example, the pipeline-creation software can indicate in the GUI that a particular processing operation is extraneous to the modelling result. Such extraneous processing operations may unnecessarily consume time and computing resources (e.g., processing power and memory) for little or no gain. So, the user can remove or adjust the parameter settings of the extraneous processing operation to avoid wasting computing resources. As another example, the GUI can indicate that a particular processing operation is harmful to the modelling result. Such harmful processing operations are not only detrimental to the modelling result but also consume time and computing resources. So, the user can remove or adjust the parameter settings of the harmful processing operation to improve the modelling result. Alternatively, the system may automatically remove or adjust the parameter settings of the harmful processing operation to improve the modelling result. In this way, the pipeline-creation software can assist the user in creating a more optimal pipeline.

In some examples, the pipeline-creation software can automatically generate program code to implement the pipeline. The program code can be automatically generated using code templates with parameters (e.g., fields and variables) that are configurable by the pipeline-creation software. The program code can be configured to be executed independently of the pipeline-creation software and more rapidly than is possible by executing the pipeline in the pipeline-creation software. For example, the pipeline-creation software can generate program code that can be deployed to a production environment for executing the pipeline on other input data, which may have the same structure as the original input data. The program code can be optimized for the production environment, for example by being configured to run on multiple processors in parallel in the production environment. Thus, the user can initially create the pipeline using the pipeline-creation software, and then quickly and easily deploy the program code for the pipeline to a computing environment, so that the pipeline can be subsequently executed in a faster manner independently of the pipeline-creation software. Generating and deploying the program code can allow the pipeline to be quickly and repeatedly executed in relation to other input data. This may also allow other software to more easily interface with and initiate the pipeline.

The pipeline can be configured to convert any suitable type of input data into an analysis table. One example of such a data type can be transactional data describing transactions associated with one or more subjects. In a typical database architecture, transactional data may be stored in a first data table that is linked to a second data table by one or more keys. An example of the second data table can be a subject table that includes subject data (e.g., attributes of the subjects that engaged in the transactions). The transactional data and/or subject data may contain large amounts of information, such as millions of rows of information. Using conventional approaches, it can be challenging for data scientists to convert the large numbers of rows of transactional data in the first data table, along with the large somewhat smaller number of rows of subject data in the second data table, into a unified analysis table that is properly formatted and suitably compatible with a target model, such as a predictive model. But some examples described herein can automate the process using a pipeline, which can yield significant improvements to the modelling results.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-12 depict examples of systems and methods usable for generating pipelines configured to transform input data into analysis tables according to some aspects of the present disclosure. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively be referred to herein as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data to a network-attached data store 110 for storage. The computing environment 114 may later retrieve the data from the network-attached data store 110 and apply the data as input to a pipeline according to some aspects described herein.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for generating pipelines generate analysis tables based on input data.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for generating pipelines configured to transform input data into analysis tables. For example, the computing environment 114, a network device 102, or both can implement one or more versions of the processes discussed with respect to any of the figures.

Figure 2:
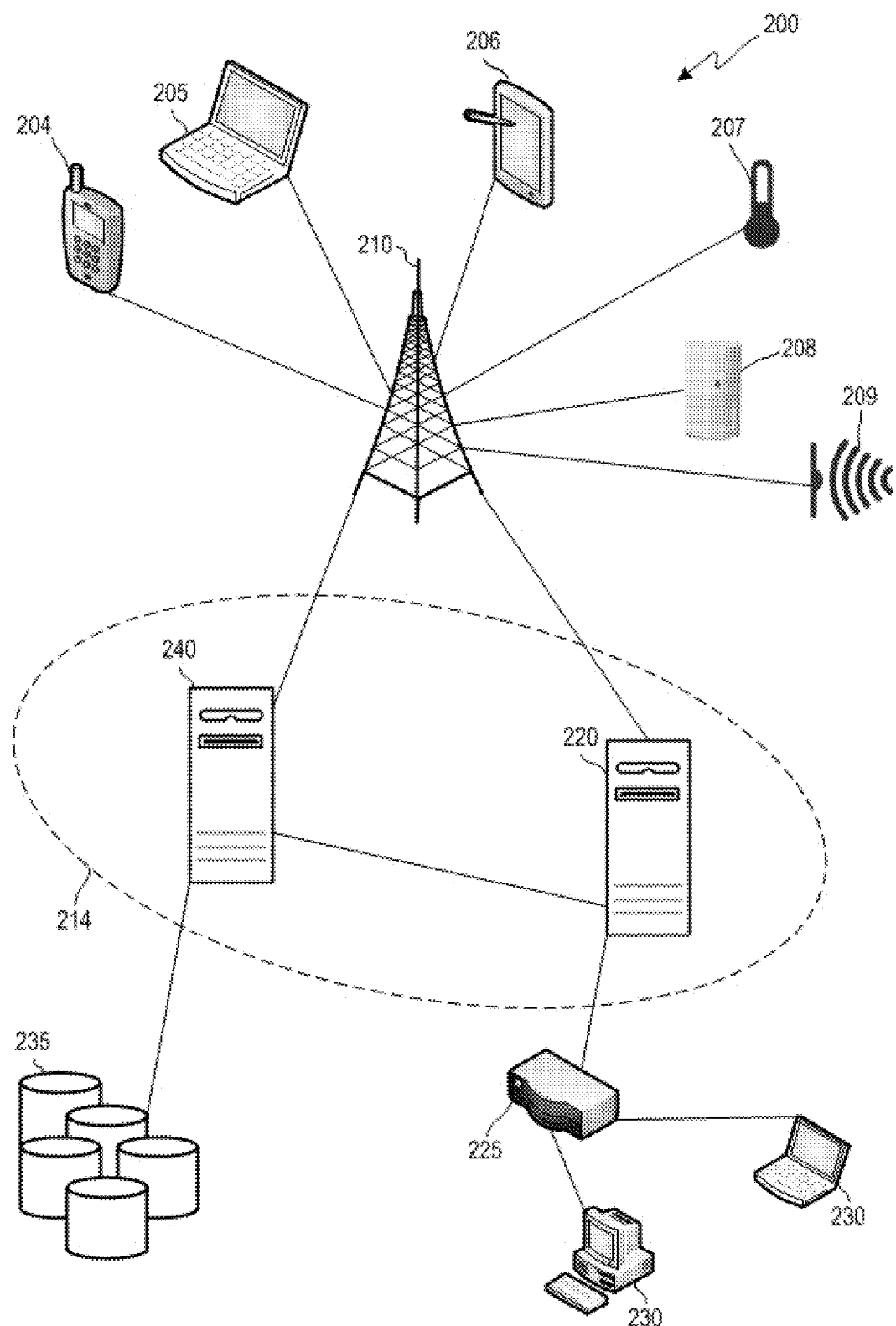
FIG. 2 depicts an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., via a pipeline).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, transactional data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a modelling project, the computing environment 214 can perform a pre-analysis of the data use one or more pipelines. The pre-analysis can include determining whether the data is in a correct format for the model using the data and, if not, reformatting the data into the correct format.

Figure 3:
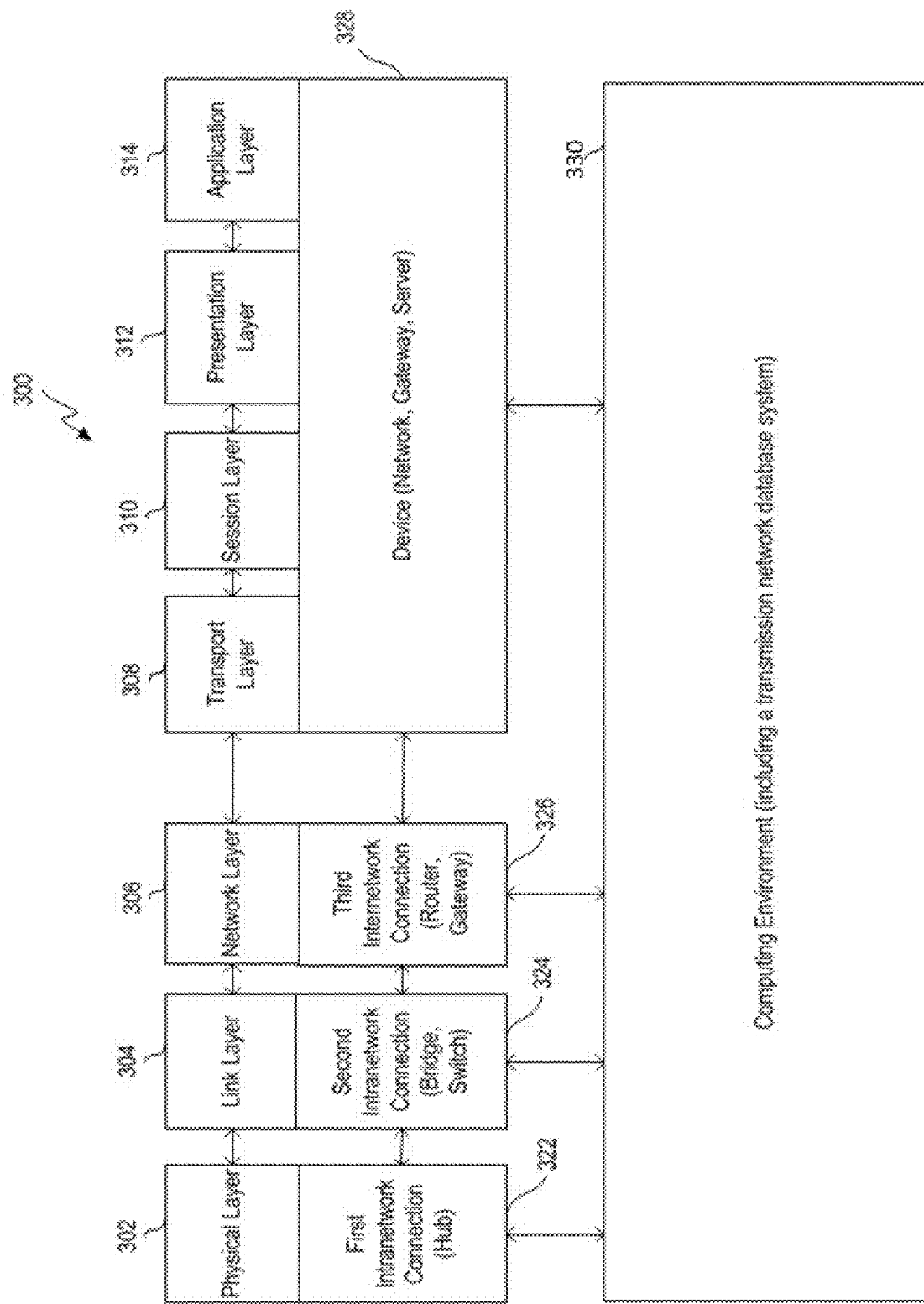
FIG. 3 depicts a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for generating pipelines configured to transform input data into analysis tables, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for a pipeline.

Figure 4:
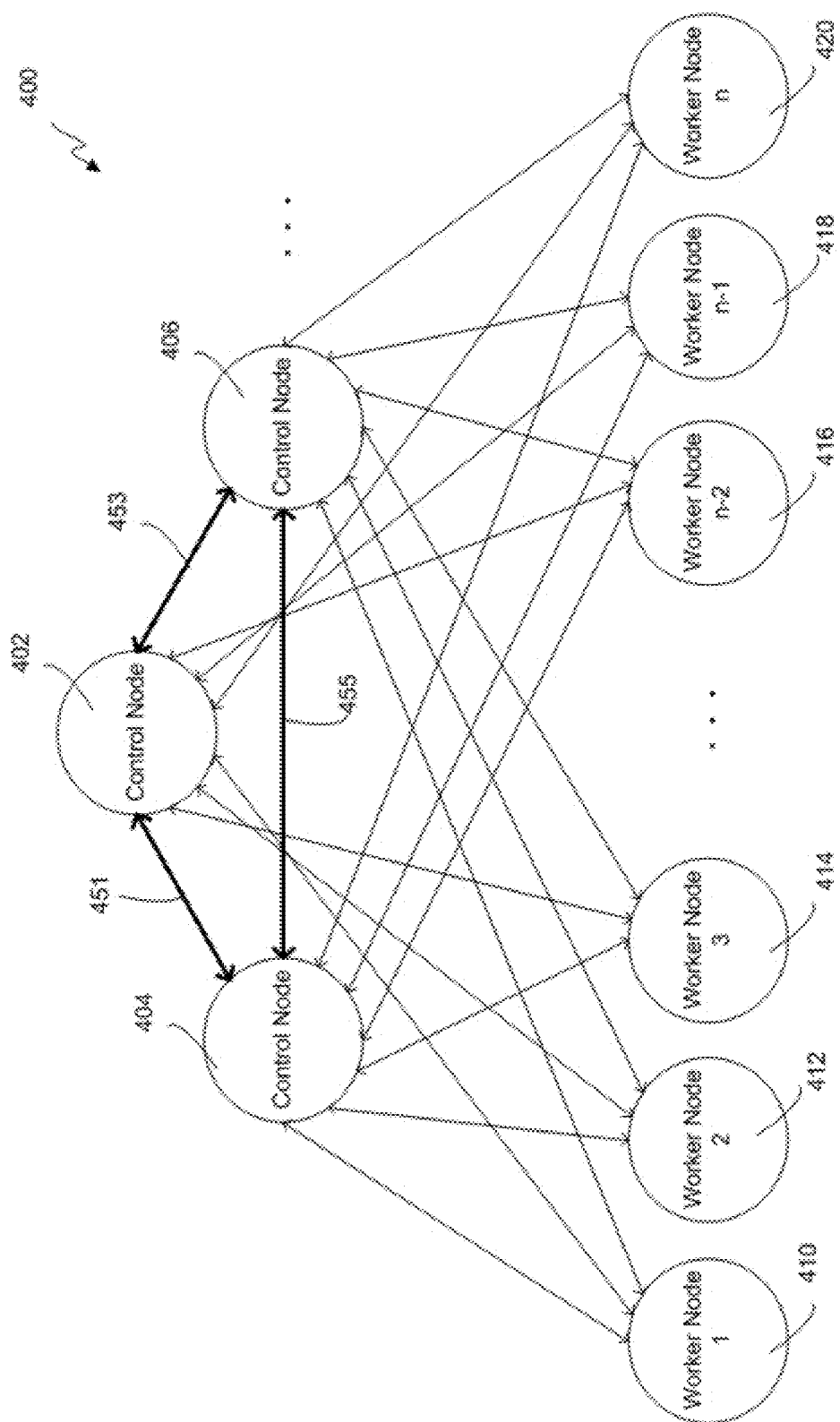
FIG. 4 depicts a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to executing a pipeline for generating an analysis table based on input data. The project may include the data set. The data set may be of any size and can include a time series, in some examples. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for generating an analysis table based on input data can be initiated on communications grid computing system 400. A primary control node can control the work to be performed for the project in order to complete the project as requested or instructed. The primary control node may distribute pipeline work to the worker nodes 412-420 based on various factors, such as which subsets or portions of projects may be completed most efficiently and in the correct amount of time. For example, a worker node 412 may execute a processing operation in the pipeline using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to generate pipelines configured for creating analysis tables for models based on input data.

Figure 5:
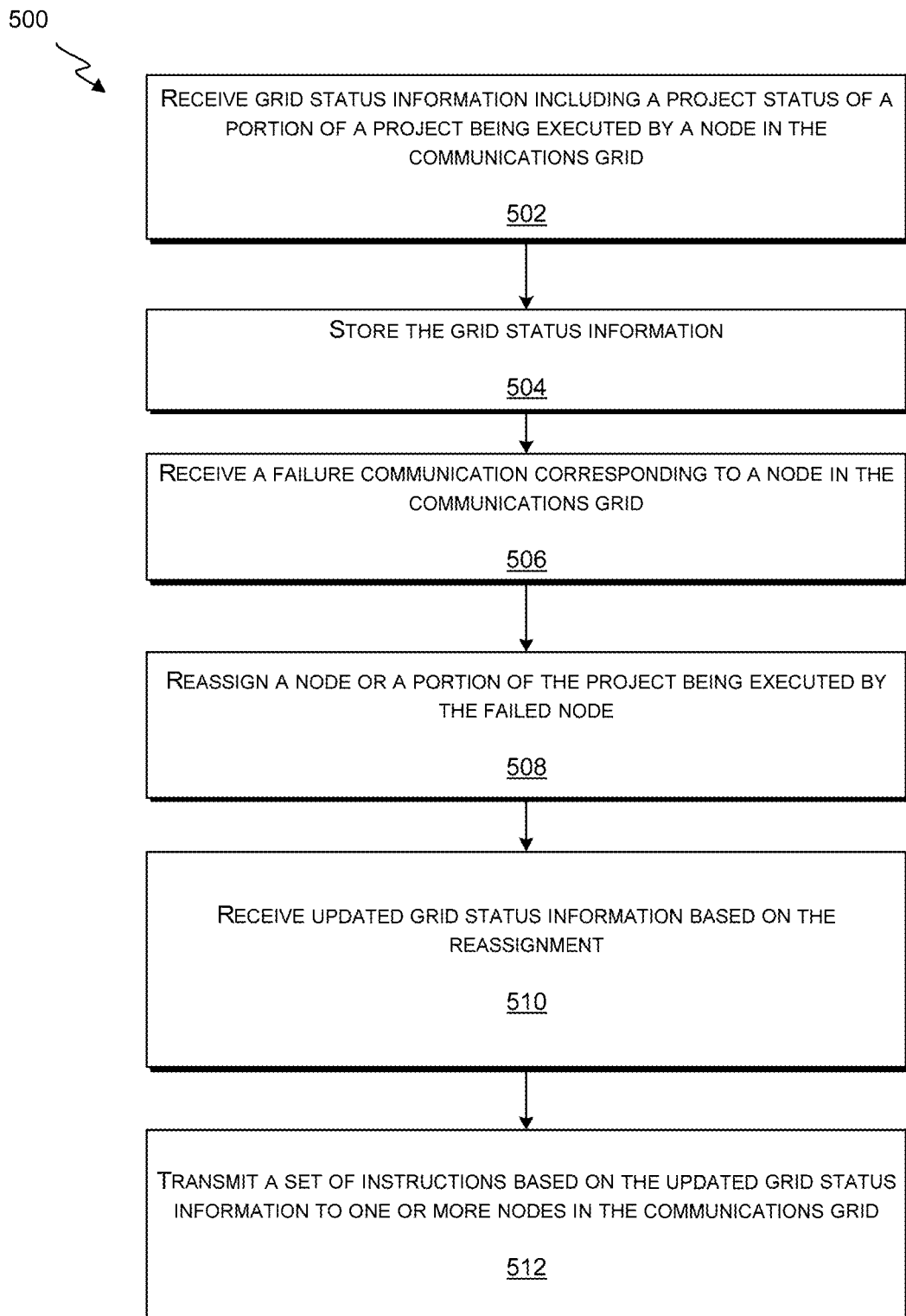
FIG. 5 depicts a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
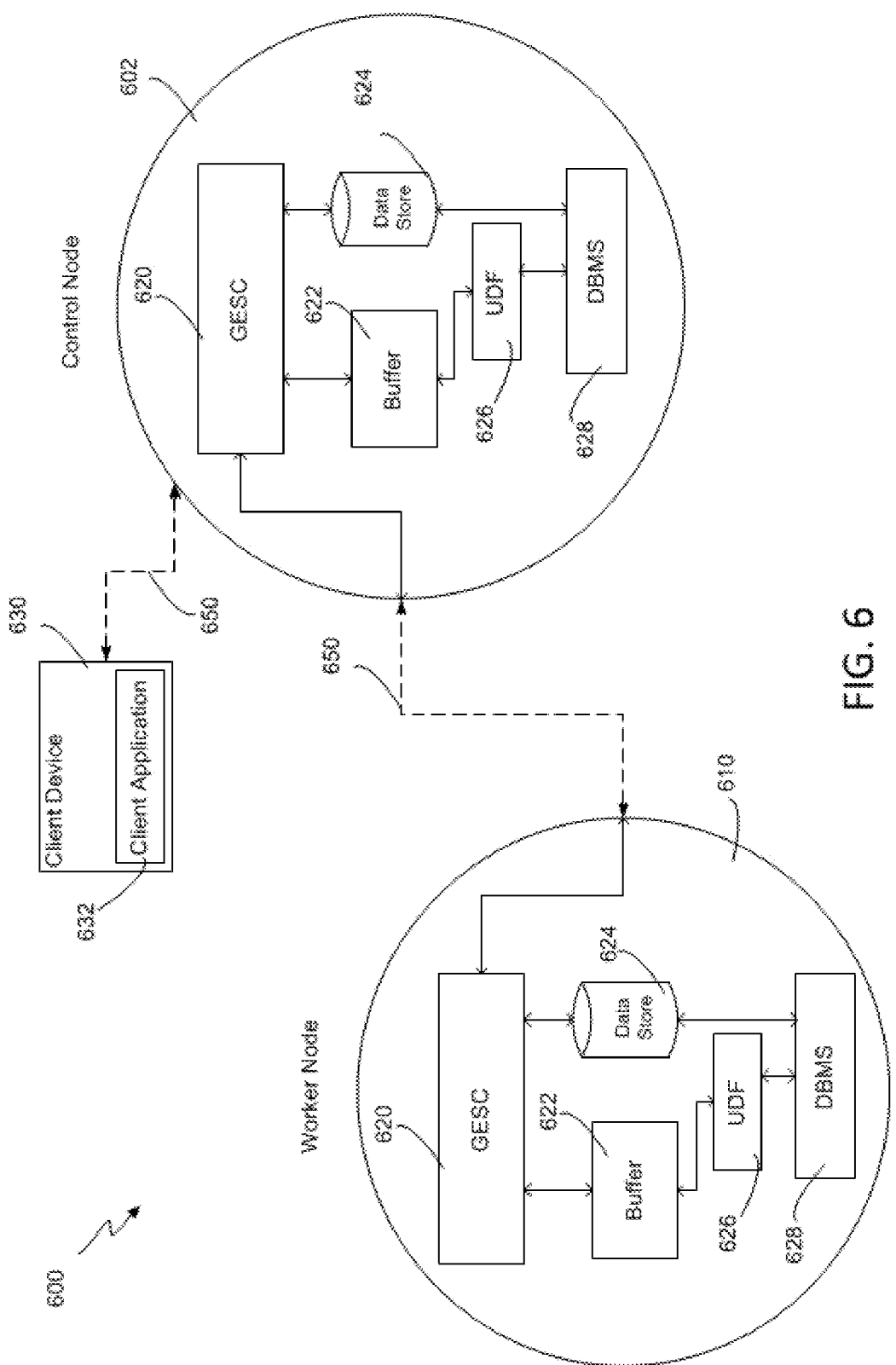
FIG. 6 depicts a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
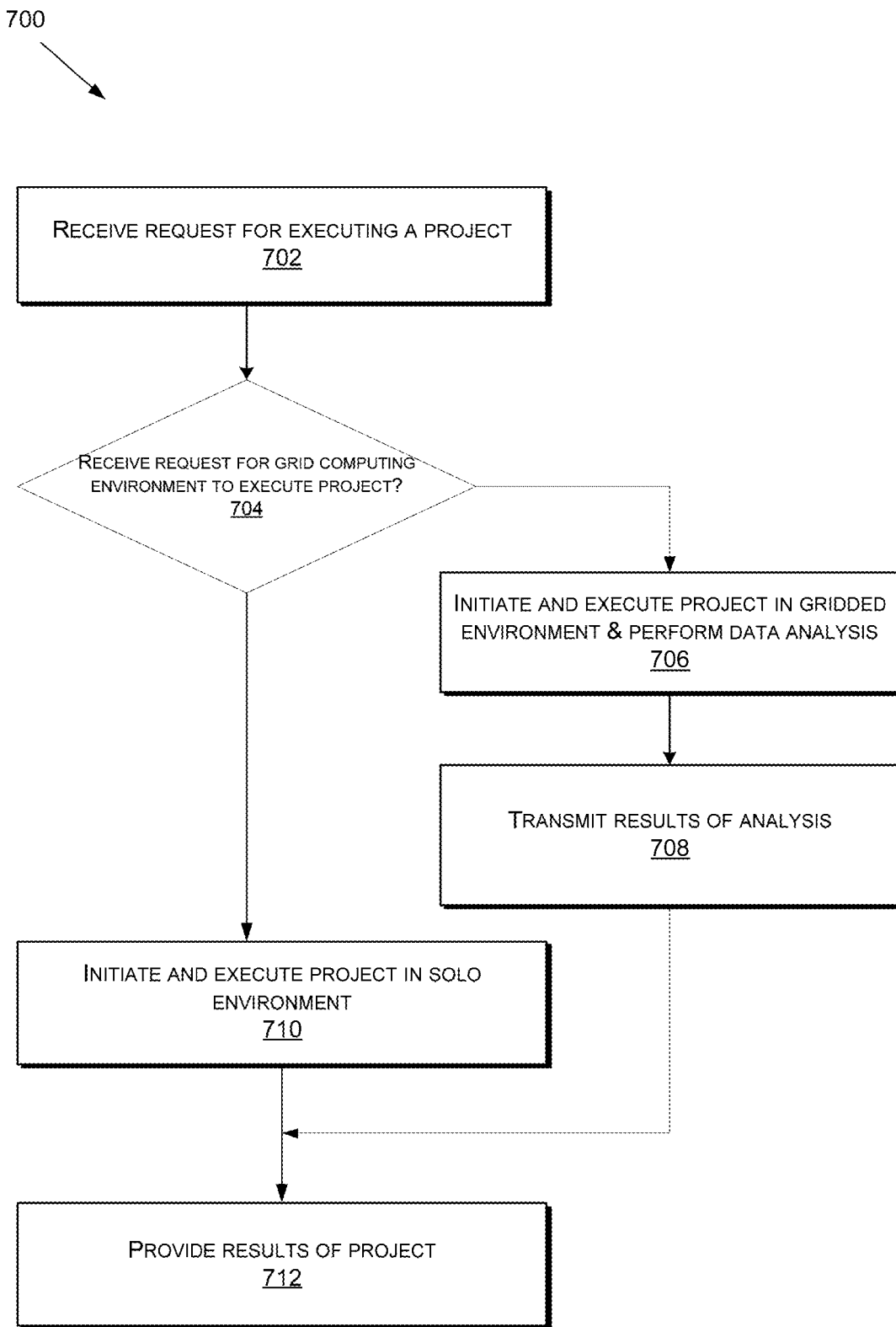
FIG. 7 depicts a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
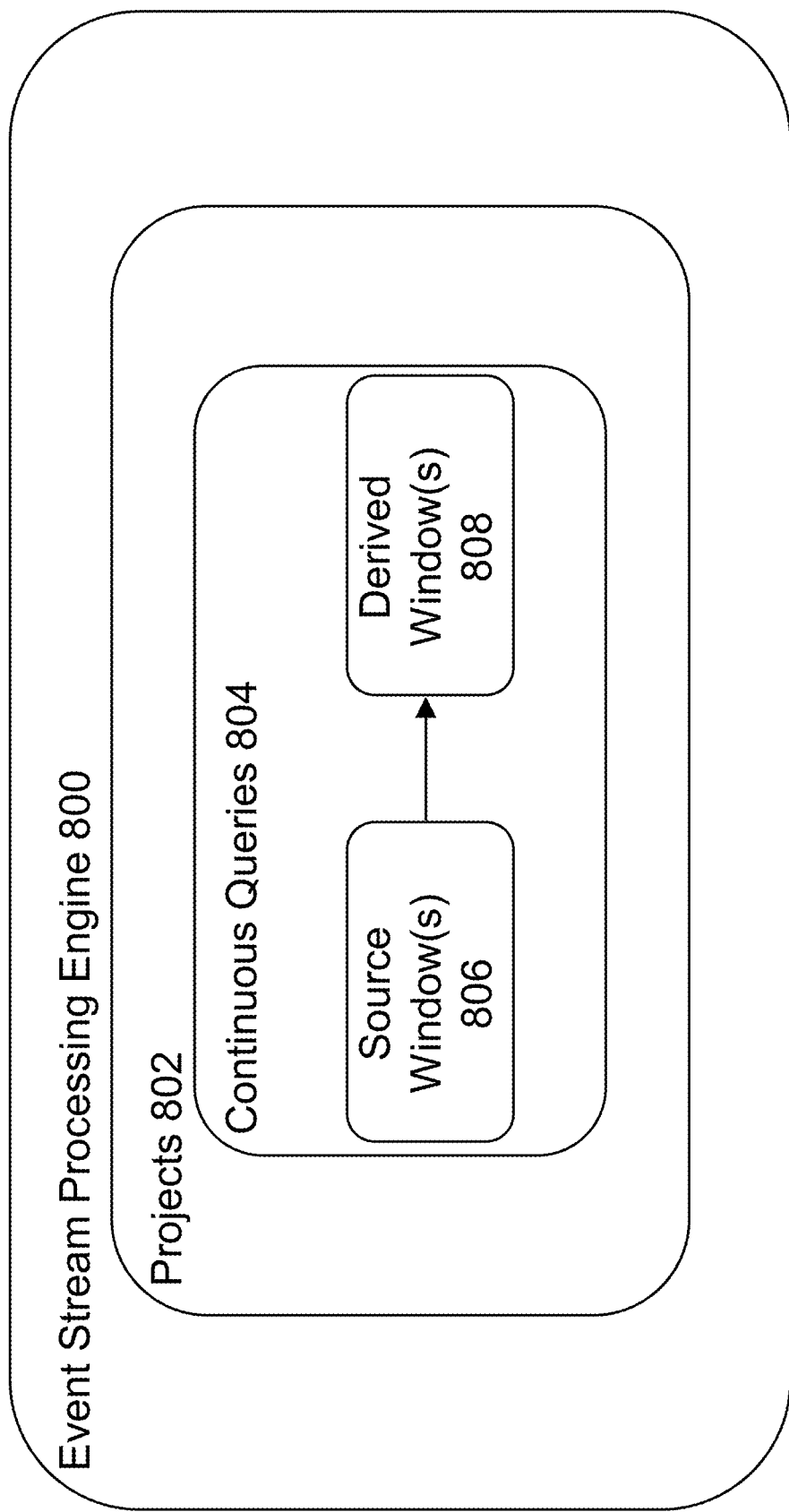
FIG. 8 depicts a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modelling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modelling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
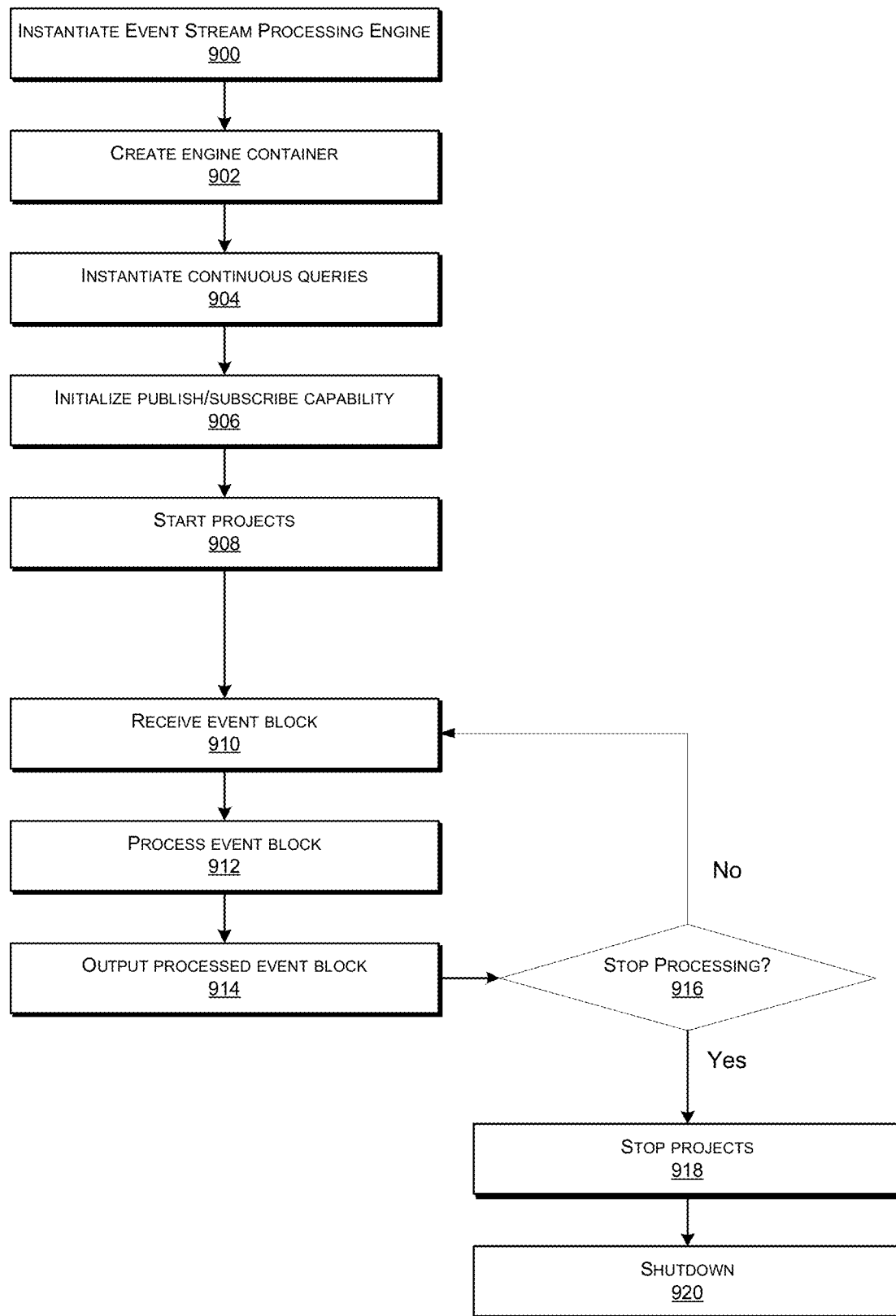
FIG. 9 depicts a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
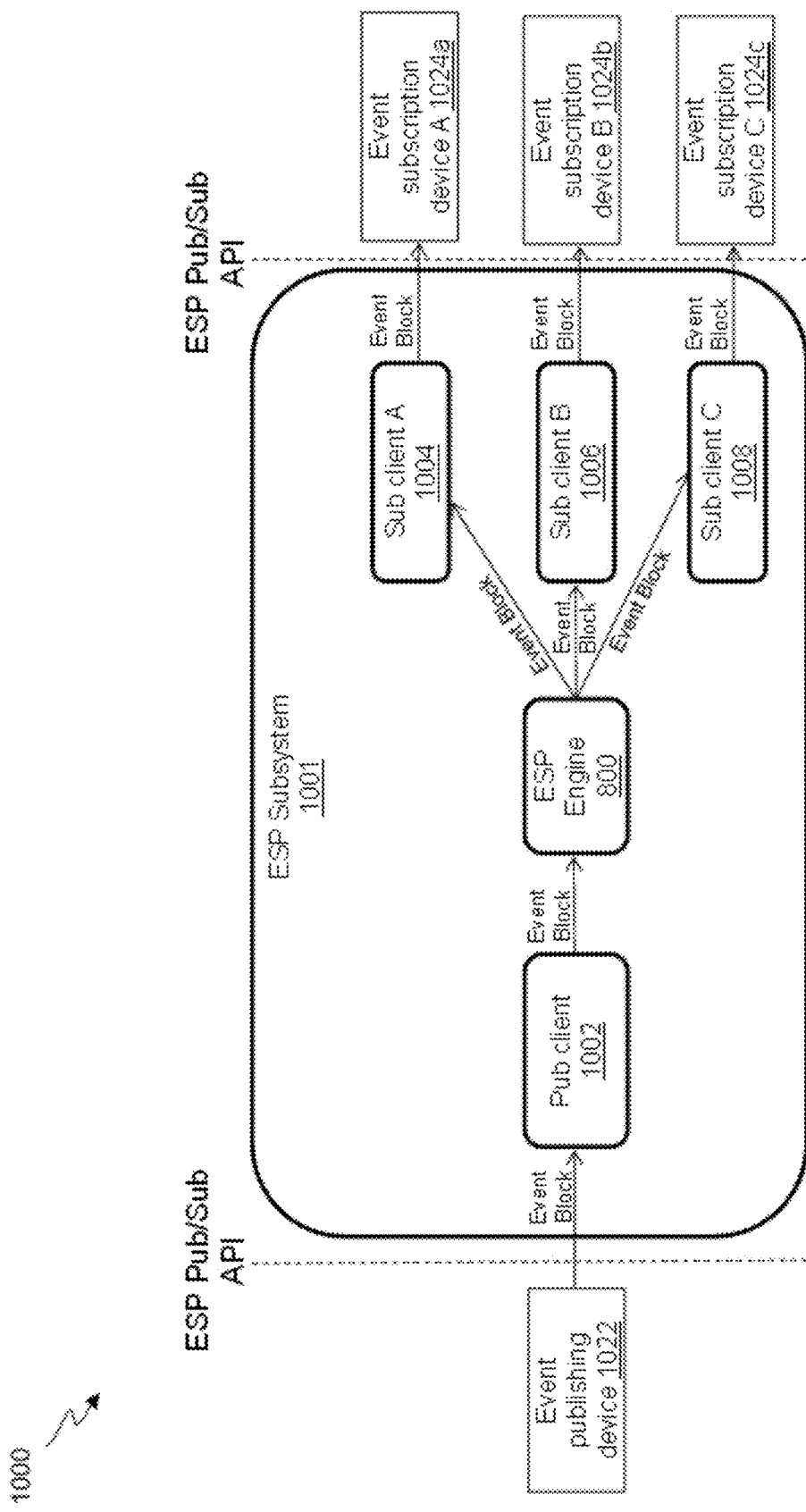
FIG. 10 depicts a block diagram of an ESP system interfacing between a publishing device and multiple event subscribing devices according to some aspects.

FIG. 10 is a block diagram of an ESP system 1000 interfacing between publishing device 1022 and event subscription devices 1024*a-c* according to some aspects. ESP system 1000 may include ESP subsystem 1001, publishing device 1022, an event subscription device A 1024*a*, an event subscription device B 1024*b*, and an event subscription device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024*a*, event subscription device B 1024*b*, and event subscription device C 1024*c*. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024*a*, event subscription device B 1024*b*, and event subscription device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024*a*, event subscription device B 1024*b*, and event subscription device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024*a* using the publish/subscribe API. Subscribing client B 1006 may be started by an event subscription application B executing at event subscription device B 1024*b* using the publish/subscribe API. Subscribing client C 1008 may be started by an event subscription application C executing at event subscription device C 1024*c* using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
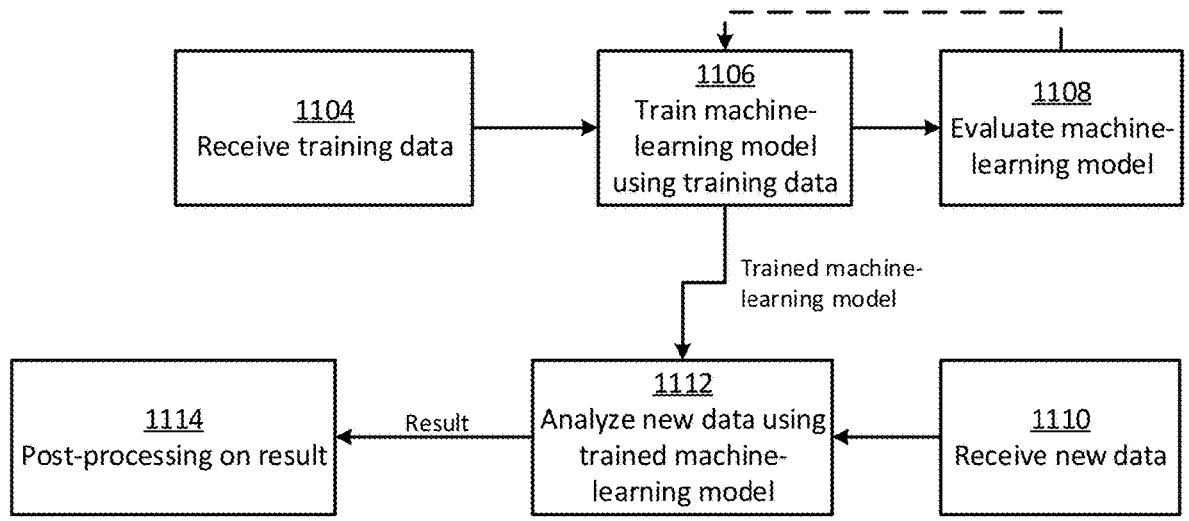
FIG. 11 depicts a flow chart of an example of a process for generating and using a machine learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. An evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
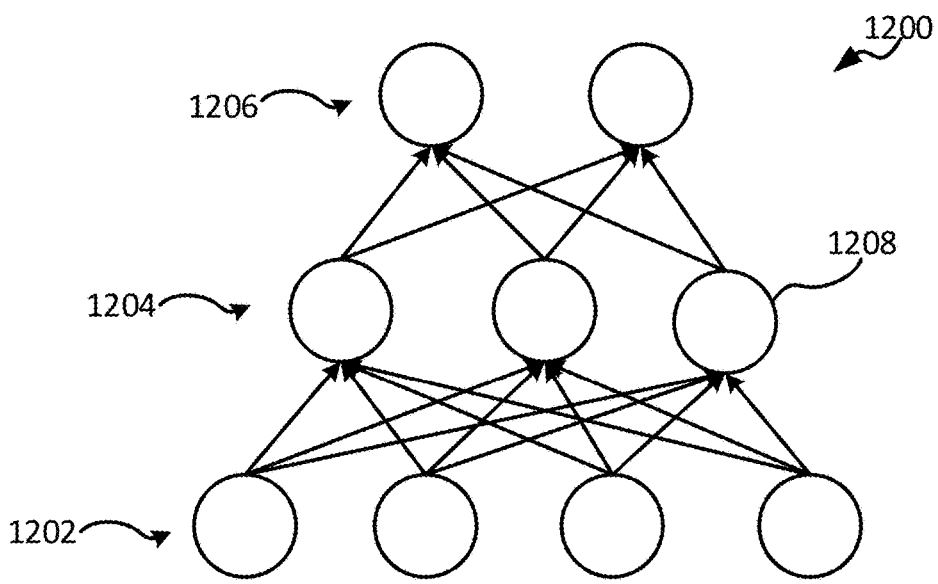
FIG. 12 depicts a node-link diagram of an example of a neural network according to some aspects.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and quickly executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, thermal processing mitigation, processing speed improvements, data communication speed improvements, and/or data efficiency targets and improvements throughout various parts of the system when compared to a homogeneous computing architecture that employs CPUs for general purpose computing.

Figure 13:
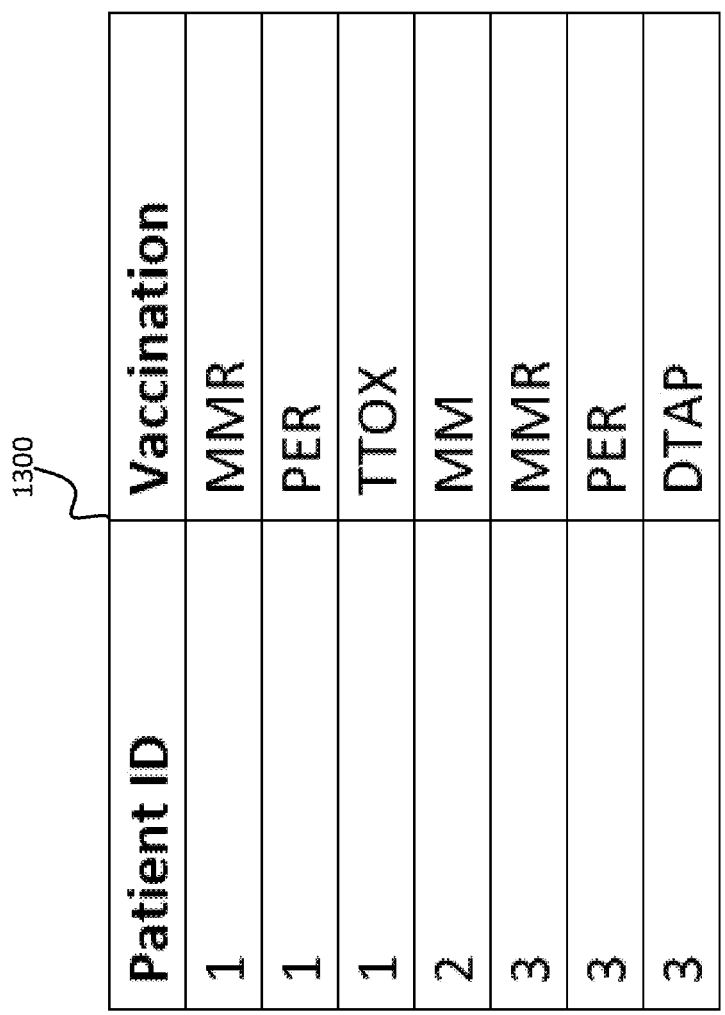
FIG. 13 depicts a data table including an example of raw data associated with patient vaccinations according to some aspects of the present disclosure.

FIG. 13 depicts a data table 1300 including an example of raw data associated with patient vaccinations according to some aspects of the present disclosure. Raw data may be data that has not yet been processed by a pipeline of the present disclosure. The raw data may be obtained from a relational database or another source.

In this example, the raw data shows vaccinations received by patients. But other examples may involve more, fewer, or different variables. Each row in the data table 1300 is a unique observation indicating a particular vaccine received by a patient. Although the exemplary data table 1300 shows a relatively small number of rows and variables for simplicity, it will be appreciated that an actual set of raw data may include millions of rows of data and hundreds or thousands of variables.

As described above, raw data may be stored in formats that are incompatible for use with a model, such as a predictive model. In this example, the raw data is in a format that may be incompatible with a model because the raw data is not organized such that all of the vaccination information associated with a single patient is in the same row of the data table 1300. Rather than having such one-to-one relationships, the data table 1300 includes several one-to-many relationships. A one-to-many relationship can occur when a single subject (e.g., a single patient) is referenced in multiple observations in a data table. Some models are unable to properly handle raw data that has one-to-many relationships. It may therefore be desirable to transform the raw data into a format that is more suitable for modelling, such as the format of the model ready data shown in FIG. 15 and described in greater detail later on.

Figure 14:
FIG. 14 depicts a data table including an example of raw data associated with vaccine codes according to some aspects of the present disclosure.

FIG. 14 depicts a data table 1400 including an example of raw data associated with vaccination codes according to some aspects of the present disclosure. In this example, the data table 1400 indicates the individual vaccines associated with a each vaccination code. For example, the vaccination code "MMR" corresponds to three vaccines—one for mumps, one for measles, and one for rubella. But, other examples may involve more, fewer, or different variables. Each row in the data table 1400 is a unique observation corresponding to a unique vaccination code. Although the exemplary data table 1400 shows a relatively small number of rows and variables for simplicity, an actual set of model ready data may include millions of rows of data and hundreds or thousands of variables.

In this example, the raw data includes one-to-many relationships between the vaccination codes and their corresponding vaccinations, because the same vaccination can be found in multiple different columns of the data table 1400. For instance, the "Mumps" and "Measles" vaccinations can each be found in both columns two and three. The "tetanus" vaccination can likewise be found in both columns two and three. The "Pertussis" vaccination can be found in columns two and four.

Figure 15:
FIG. 15 depicts an example of transforming raw data into model ready data according to some aspects of the present disclosure.

In some examples, it may be desirable to convert the data tables 1300, 1400 of FIGS. 13-14 into a corresponding analysis table having "model ready data," which can be data that is properly formatted to be compatible with a target model. One example of such an analysis table 1500 is shown in FIG. 15. The analysis table 1500 includes one row for each subject (e.g., patient) and one column for each disease that the patient might be vaccinated against. Thus, the analysis table 1500 includes one-to-one relationships and lacks the one-to-many relationships, rendering the analysis table 1500 more compatible with certain models than the raw data.

In the analysis table 1500, each cell either has a value of zero or has a value of one. A value of one in a cell indicates that the corresponding patient was vaccinated for the corresponding disease. A value of zero in a cell indicates that the corresponding patient was not vaccinated for the corresponding disease. Although a particular patient may have been vaccinated multiple times for the same disease (e.g., patient three was vaccinated twice for pertussis), in this example the cell values are binary values indicating if a patient was or was not vaccinated for a particular disease.

Although the examples shown in FIGS. 13-15 are overly simplistic for exemplary purposes, a real scenario may be far more complex. Such complex scenarios may require a data scientist to spend days or weeks manually identifying relevant variables and performing this conversion process to generate an analysis table (e.g., a table with model ready data) for use in a modelling process. But in some examples, the generation of such analysis tables can be automated, for example by using the process shown in FIG. 16.

Figure 16:
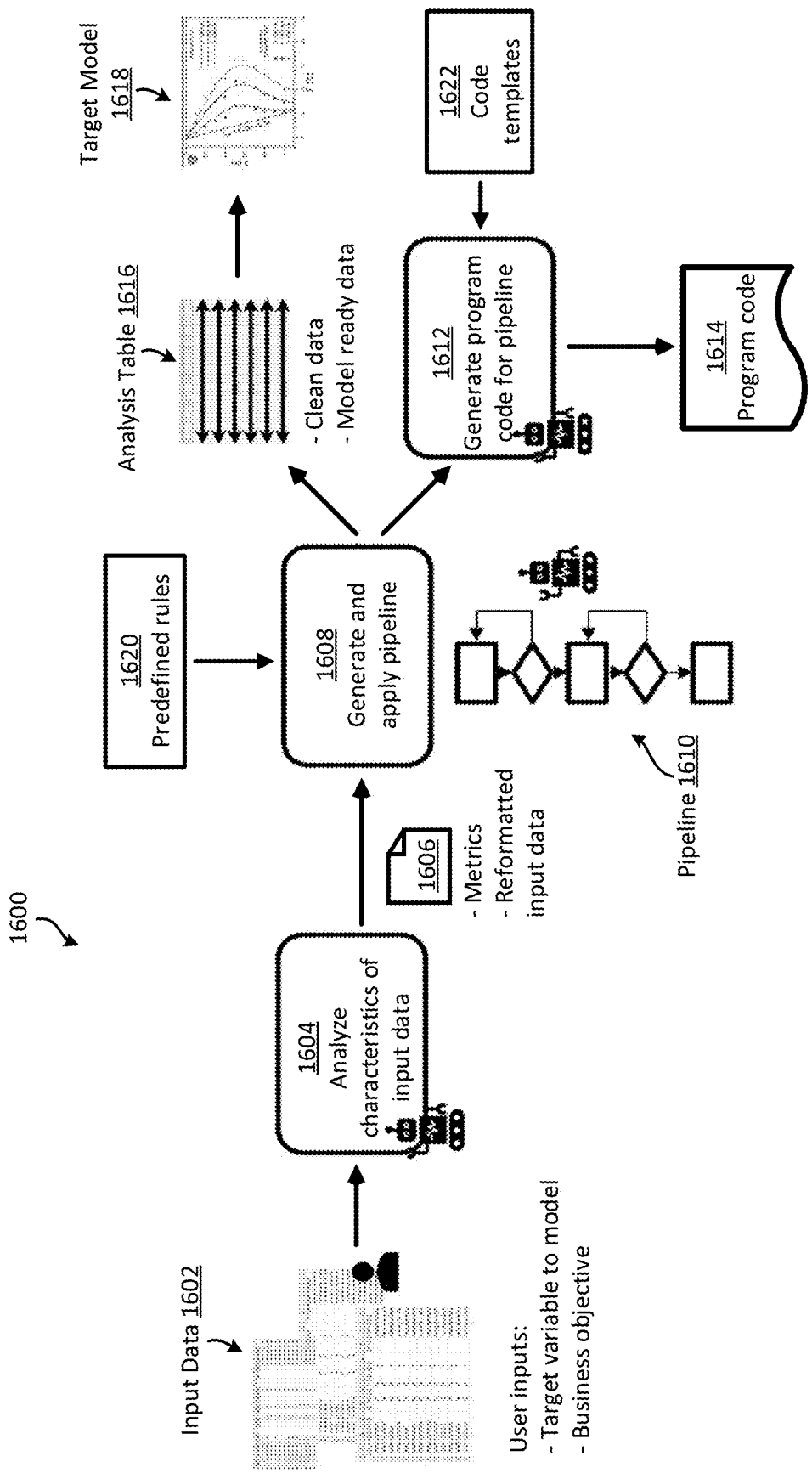
FIG. 16 depicts an example of a process for generating a pipeline according to some aspects of the present disclosure.

FIG. 16 depicts an example of a process 1600 for generating a pipeline according to some aspects of the present disclosure. While FIG. 16 depicts a certain sequence of operations for illustrative purposes, other examples can include more operations, fewer operations, different operations, or a different order of the operations shown in FIG. 16. The process 1600 may be implemented by one or more processing devices, which may collectively be referred to herein as "a processing device."

The process 1600 begins with a processing device obtaining input data 1602. In some examples, the processing device can obtain the input data 1602 by downloading or otherwise receiving the input data 1602 from a source, such as a database. In other examples, the processing device can obtain the input data 1602 by generating some or all of the input data 1602.

The input data 1602 can include one or more data tables with rows and columns. Each row or column, depending on the configuration, may correspond to an individual observation. The data tables may be key-linked (e.g., linked together by one or more keys). As one specific example, the input data 1602 can include a transaction table with transaction data. Each row in the transaction table can correspond to a transaction and include one or more variable values describing attributes of the transaction. Examples of transactional data may include product demand data, vaccination data, phone call data, website visitation data, software download data, etc. The input data 1602 may also include a subject table with subject data. Each row in the subject table can correspond to a subject associated with a transaction described in the transaction table and include one or more variable values describing attributes of the subject. The transaction table and the subject table may be linked together by a key, such as by subject.

The processing device may also receive user inputs. For example, the processing device can receive a user selection of a target variable to model in a modelling process. The target variable may be one of the variables included in the data tables of the input data 1602. Additionally or alternatively, the processing device can receive a user selection of an objective associated with the modelling process. In some examples, the user may provide such user inputs to the processing device via a graphical user interface (GUI) of pipeline-creation software.

In some examples, the input data 1602 can include one-to-many relationships or may otherwise be sub-optimal for use with a target model 1618. It may therefore be desirable to execute some or all of the remaining operations of FIG. 16 to generate a pipeline 1610 configured to transform the input data 1602 into an analysis table 1616 that is better suited to the target model 1618.

More specifically, in operation 1604, the processing device analyzes one or more characteristics of input data 1602 to generate an output 1606. In some examples, the output 1606 can include metrics associated with the input data 1602. Examples of the metrics can include statistical information, cardinality information, frequency information, and content classifications associated with the input data 1602. The statistical information may include, for example, a mean or standard deviation of a variable value in the input data 1602. The cardinality information may include, for example, a number of unique elements in a variable set in the input data 1602. The frequency information may include, for example, a count of how many times a variable value is present in the input data 1602. Content classifications may include, for example, groups or clusters assigned to content in the input data 1602. The processing device can determine the metrics using any suitable approach. For example, the processing device may execute one or more machine-learning models to determine the metrics. In one such example, the processing device can execute a classifier model on the input data 1602 to determine one or more classes associated with observations or variables in the input data 1602.

In some examples, the output 1606 can indicate data quality problems relating to the input data 1602. For example, the processing device can execute a decision tree analysis with respect to the input data 1602 to identify problematic (e.g., improperly formatted, inconsistent, or missing) variable values. Problematic variable values may indicate that the input data 1602 is of poor quality. The processing device may assign the input data 1602 a data quality score based on such analysis. One example of such a data quality score may be a numerical value that falls between 0 and 100, with higher values corresponding to higher quality and lower values corresponding to lower quality.

In some examples, the output 1606 can include reformatted versions of the input data 1602. For example, the processing device can automatically cleanse the input data 1602 by executing processing operations on the input data 1602, to de-duplicate, standardize, recode, impute, or enrich the input data 1602. As another example, the processing device can automatically join information in the input data 1602 together based on the determined metrics, for example by clustering data together based on the classes (e.g., join keys) determined using the clustering model. Reformatting the input data 1602 using some or all of these techniques may make the input data 1602 more suitable for use in subsequent steps of the process 1600.

In operation 1608, the processing device generates a pipeline 1610. In some examples, the processing device can automatically generate the pipeline 1610 based on the output 1606. For example, the processing device can select processing operations to include in the pipeline 1610 based on the metrics and/or the reformatted input data associated with the output 1606. In other examples, the pipeline 1610 may be generated based on input from the user. For example, a user can manually select the processing operations to include in the pipeline 1610. In still other examples, the pipeline 1610 may be partially generated by the processing device and partially generated by the user, for example through an iterative process in which an initial version of the pipeline 1610 is automatically generated by the processing device and then further refined by the user.

The processing operations can each be configured to perform any number and combination of tasks. For example, a processing operation can be configured to transpose variables to features, group variables, generate rules from variable combinations, perform dimensionality reduction, identify sequences, accumulate information based on statistical information such as mean or moment statistics, perform time-series analysis, or any combination of these. In some examples, the processing operations can leverage supervised- and unsupervised-machine-learning models to perform some or all of the tasks. The processing operations may pass variable values and other information between one another to facilitate execution of the pipeline 1610.

Any number and combination of processing operations may be included in the pipeline 1610 based on predefined rules 1620. As one example, the processing device can include a cardinality-reduction operation in the pipeline 1610 if the metrics indicate that the input data includes high-cardinality variables. Examples of high-cardinality variables may be e-mail addresses, identification numbers, phone numbers, or user names. The cardinality-reduction operation can involve executing a machine-learning model configured to reduce the cardinality of a variable in the input data.

As another example, the processing device can include a frequency-rollup operation in the pipeline 1610 if the metrics indicate that the input data has one or more high-frequency variable values. The frequency-rollup operation can involve executing a machine-learning model to identify the high-frequency variable values in the input data 1602. A high-frequency variable value can be a variable value that is among the k most frequently occurring values in the input data 1602 and that occurs at least i times, where k and i may be selected by the user. After determining the high-frequency variable values, the frequency-rollup operation can calculate a frequency metric for each high-frequency variable value. The frequency metric for a high-frequency variable value can be calculated by weighting the frequency of the high-frequency variable value by a count variable. The frequency-rollup operation may then add the frequency metrics as a new variable in the analysis table 1616.

As yet another example, the processing device can include text-analysis operation in the pipeline 1610 if the metrics indicate that the input data has text data. If the text data is structured text, the text-analysis operation can be configured to generate a pseudo-document or another data structure (e.g., a string) that includes some or all of the structured text concatenated together. In some cases, this may allow the structured text to be analyzed as if it was unstructured text. Analyzing the structured text as if it was unstructured text may provide numerous advantages. For example, each of the items in the structured text may be treated like "terms" in a term dictionary, thereby allowing the processing device to automatically determine that certain categorical items are related to one another based on the relationships of the corresponding terms in the term dictionary. Identifying such relationships may otherwise be difficult or impossible by analyzing the structured text directly. Additionally or alternatively, the processing device can include an operation to project each subject's set of values for the categorical variable into a multidimensional space, such that similarity of subjects is indicated by proximity in that multi-dimensional space. The axes in that space may be rotated, such that subjects might be aligned by certain characteristics of their data, like topics for unstructured data analysis. For example, if the data indicates different movies or books associated with individuals (e.g., in their social media profiles), then the processing device could identify people that are interested in certain genres.

The processing operations can be selected (e.g., manually by the user and/or automatically by the processing device) from a toolbox of available processing operations. The toolbox may be included in pipeline-creation software executed by the processing device. The toolbox can be extensible, in that new processing operations can be added to the toolbox over time. For example, the user can download new processing operations from the Internet and/or manually program new processing operations.

In examples in which the processing device automatically selects the processing operations to include in the pipeline 1610, the processing device may also automatically determine an order for the processing operations in the pipeline 1610. In some examples, the processing device can determine the order based on predefined rules 1620. The predefined rules 1620 may specify that certain processing operations are to occur before or after other processing operations. For example, a first processing operation may supply a required output to a second processing operation. So, the predefined rules 1620 may specify that the second processing operation is to follow the first processing operation. As another example, the predefined rules 1620 may specify that certain types of variables are to be processed by the pipeline 1610 before other types of variables. For instance, it may be desirable to process structured text before processing numerical values, and this may be reflected in the predefined rules 1620. Based on such predefined rules 1620, the processing device may position a first processing operation configured to process structured text prior to a second processing operation configured to process numerical values in the pipeline 1610. It will be appreciated that any number and combination of techniques can be used to organize the processing operations in the pipeline 1610 into a particular order.

In some examples, the processing device can present the pipeline 1610 to the user. For example, the processing device can generate a visual depiction of the pipeline 1610 in a GUI of the pipeline-creation software. The user may then be able to further customize the pipeline 1610, for example by dragging-and-dropping processing operations from the toolbox into the pipeline 1610, deleting existing processing operations in the pipeline 1610, and/or reorganizing the processing operations in the pipeline 1610 as desired. For simplicity, an automatically generated pipeline may be referred to herein as an "initial pipeline" in its initial form prior to user customizations, and may be referred to as a "customized pipeline" in its subsequent form after one or more user customizations.

Once the user determines that the pipeline 1610 is ready to be executed, the user can initiate the pipeline 1610. The processing device can apply the pipeline 1610 to the input data to generate an analysis table 1616 suitable for use with the target model 1618. The input data to which the pipeline 1610 is applied may be the original input data 1602 or the reformatted input data generated in operation 1604. Applying the pipeline 1610 to the input data can involve executing the pipeline 1610 on the input data to generate the analysis table 1616, which can include model ready data (e.g., clean and properly formatted data).

Having automatically created the analysis table 1616, in some examples the processing device may then execute the target model 1618 on the analysis table 1616. For example, the processing device can provide the analysis table 1616 as input to a predictive model that is configured to predict a value for a target variable. The target variable may have been selected by the user prior to operation 1604. The predictive model can receive the analysis table 1616 and responsively generate a predicted value for the target variable. The predicted value may then be output to the user, for example as part of the GUI of the pipeline-creation software.

In some examples, the processing device can also implement operation 1612. In operation 1612, the processing device generates program code 1614 for the pipeline 1610. The program code can be programmed in any suitable programming language, such as Java, C++, C, Python, R, or SAS Language, which is a proprietary programming language created by SAS Institute® of Cary, N.C.

The program code may be configured to be deployed outside the context of the pipeline-creation software that was used to generate the pipeline 1610. For example, the program code can be configured to be deployed to a production environment and executed on input data (e.g., input data 1602 or different input data), without using the pipeline-creation software. Since the pipeline-creation software can include various software elements that consume computing resources (e.g., memory and processing power) and introduce computational overhead, executing the pipeline 1610 outside of the context of the pipeline-creation software by using the program code can reduce consumption of computing resources and significantly expedite execution of the pipeline 1610.

In some examples, the processing device can generate the program code using one or more code templates 1622. In particular, the processing device may have access to a repository of predefined code templates 1622. Each code template 1622 in the repository can include a segment of program code that can be incorporated into the overall program code 1614. The segment of program code may have variables that are modifiable throughout the flow of the pipeline 1610. Such variables may also be used by other tools. The segment of program code may be used to define one or more of the processing operations in the pipeline 1610. Since each code template 1622 may correspond to one or more of the processing operations in the pipeline 1610, the processing device can select the code templates 1622 from the repository based on the processing operations in the pipeline 1610 and include the code templates 1622 into the program code 1614. In some examples, the processing device can organize the code templates 1622 in the program code 1614 based on the order of the corresponding processing operations in the pipeline 1610. For example, the processing device can organize the code templates 1622 in the program code 1614 in the same sequence that the processing operations are organized in the pipeline 1610.

In some examples, the processing device can modify the code templates 1622 before or after incorporating them into the program code 1614. For example, the processing device can modify variable values of a code template 1622 based on one or more parameters provided by the user. Additionally or alternatively, the processing device can modify the variable values based on one or more parameters determined in operation 1604, such as one or more of the metrics. Additionally or alternatively, the processing device can modify the variable values based on one or more parameters determined in operation 1608, for example based on one or more processing operations executed in the pipeline 1610.

The processing device can generate the program code before executing, while executing, or after executing the pipeline 1610. For example, the processing device can dynamically build the program code 1614 while executing the pipeline 1610. In one such example, the processing device can execute the pipeline 1610 as a sequence of steps. Each step can involve performing a corresponding processing operation. Each step may also involve selecting, modifying, and incorporating a corresponding code template into the program code 1614. In this way, the program code 1614 can be dynamically built over the course of the sequence of steps. By dynamically building the program code 1614 while the pipeline 1610 is executed, or by building the program code 1614 after the pipeline 1610 is executed, the program code 1614 can be customized to include information (e.g., variables or variable values) generated as a result of one or more processing operations in the pipeline 1610. This may not be possible if the program code 1614 is generated prior to executing the pipeline 1610.

Figure 17:
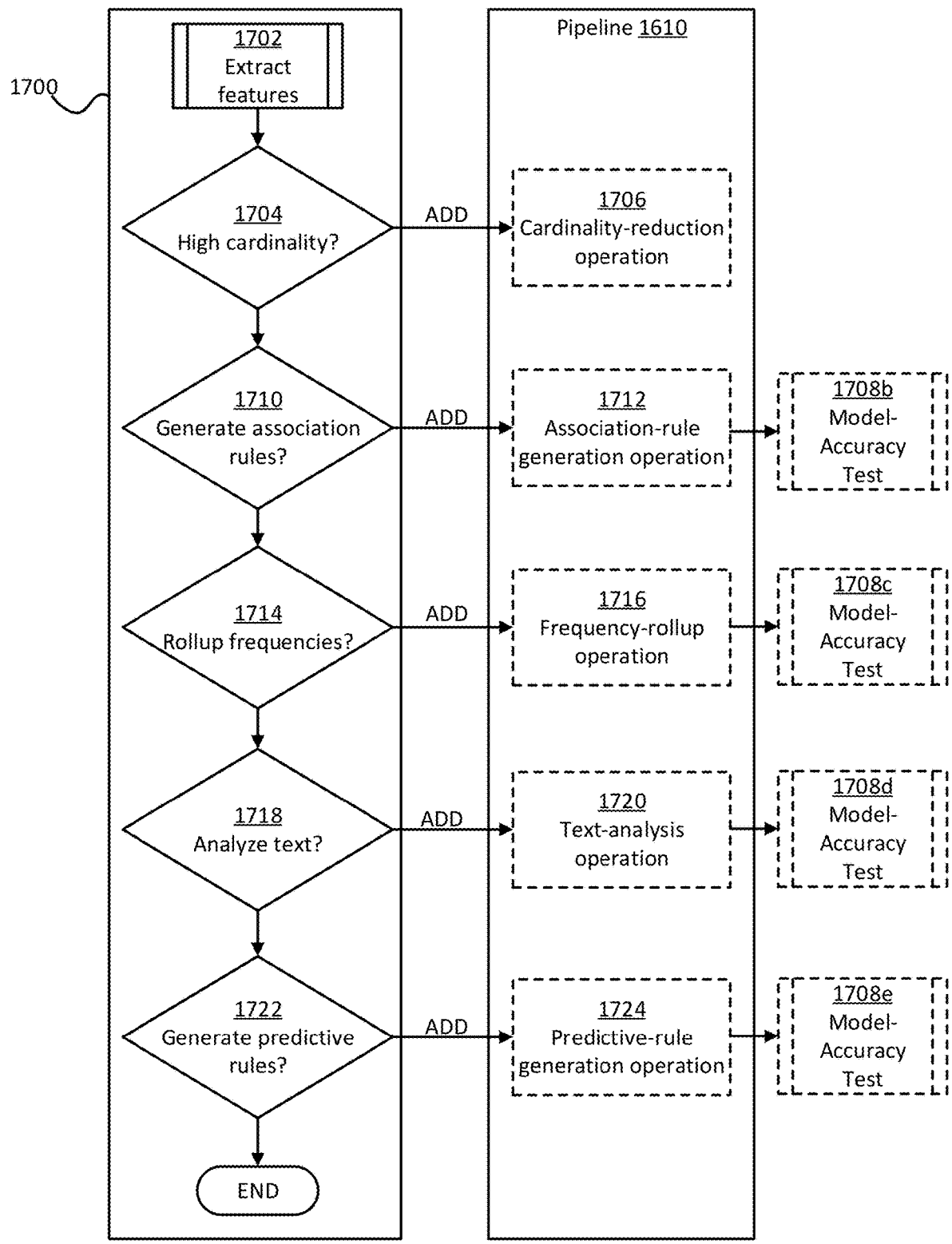
FIG. 17 depicts an example of a process for automatically generating a pipeline according to some aspects of the present disclosure.

One example of a process 1700 for automatically generating a pipeline 1610 is shown in FIG. 17. The process 1700 may be implemented by the pipeline-creation software, in some examples. While FIG. 17 depicts a certain sequence of operations for illustrative purposes, other examples can include more operations, fewer operations, different operations, or a different order of the operations shown in FIG. 17. The operations of FIG. 17 are described below with reference to the components of FIG. 16 described above.

The process 1700 beings at operation 1702, which in some examples may be a subpart of operation 1604. At operation 1702, a processing device extracts features from input data 1602. This may involve performing one or more feature-extraction operations on the input data 1602. Examples of the features may be the metrics described above, such as statistical information, cardinality information, frequency information, and content classifications. Such features may be derived from, but not explicitly included in, the input data 1602.

At operation 1704, the processing device determines if the input data 1602 has a high cardinality. The processing device may make this determination based on the features extracted in operation 1702. The input data 1602 can have a high cardinality if the input data 1602 includes one or more variables that have a high cardinality. If the processing device determines that the input data 1602 does not have a high cardinality, the process 1700 can proceed to operation 1710. Otherwise, the processing device can add a cardinality-reduction operation 1706 into the pipeline 1610.

The cardinality-reduction operation 1706 can automatically reduce the number of levels associated with a high-cardinality variable in the input data 1602. A "level" is a value of a variable. A high-cardinality variable is a variable with a large number of values in the input data 1602. For example, a variable that has 1000 different values in the input data 1602 may be considered a high-cardinality variable that has 1000 levels. The cardinality-reduction operation 1706 can reduce the total number of levels associated with a high-cardinality variable that exist in the input data 1602. For example, the cardinality-reduction operation 1706 can collapse together rarely occurring levels for a high-cardinality variable, can collapse together more-common levels for a target variable selected by the user, or both of these. Reducing the amount of levels that are incorporated in the input data 1602, and thus that are later incorporated into the analysis table 1616, may focus the analysis table 1616 on the more-relevant variable values. This can yield improved modelling results, since less-relevant variable values (e.g., extraneous variable values) are excluded from the analysis table 1616. Reducing the amount of levels that are incorporated into the analysis table 1616 may also decrease the size of the analysis table 1616. This can enable the analysis table 1616 to be analyzed faster by the target model 1618.

At operation 1710, the processing device determines if association rules are to be generated. The processing device may make this determination based on the features extracted in operation 1702. Association rules can be rules for correlating levels of one or more variables together. If the processing device determines that the association rules are not to be generated, then the process 1700 can continue to operation 1714. Otherwise, the processing device can add an association-rule generation operation 1712 into the pipeline 1610.

The association-rule generation operation 1712 can automatically generate association rules for levels of one or more variables in the input data 1602. If the variables are in a particular taxonomy, the association-rule generation operation 1712 can generate the association rules based on that taxonomy.

In some examples, the association-rule generation operation 1712 can generate the rules by performing a market basket analysis on the input data 1602. Market basket analysis can be a technique that identifies the strength of associations between pairs of variables and identifies patterns of co-occurrence. A co-occurrence is when two or more things (e.g., variable values) take place together. Market basket analysis can produce If-Then scenario rules, for example if variable A has value X then it is likely that variable B has value Y. The rules can be probabilistic in nature in that they can be derived from the frequencies of co-occurrences in the observations of the input data 1602. A new variable can be added to the analysis table 1616 for each new rule that is generated. In this way, the association-rule generation operation 1712 can add information to the analysis table 1616 that was not originally present in the input data 1602.

At operation 1714, the processing device determines if frequencies are to be rolled up. The processing device may make this determination based on the features extracted in operation 1702, possibly as reduced by operation 1706. If the processing device determines that frequencies are not to be rolled up, the process 1700 can continue to operation 1718. Otherwise, the processing device can add a frequency-rollup operation 1717 into the pipeline 1610.

The frequency-rollup operation 1716 can determine high-frequency variable values in the input data 1602. After determining the high-frequency variable values, the frequency-rollup operation 1716 can calculate a frequency metric for each high-frequency variable value. The frequency-rollup operation 1716 may then add a new variable for the frequency metrics in the analysis table 1616. In this way, the frequency-rollup operation 1716 can add information to the analysis table 1616 that was not originally present in the input data 1602.

At operation 1718, the processing device determines if text in the input data 1602 is to be analyzed. The processing device may make this determination based on the features extracted in operation 1702. If the processing device determines that text in the input data 1602 is not to be analyzed, the process 1700 can continue to operation 1722. Otherwise, the processing device can add a text-analysis operation 1720 into the pipeline 1610.

In some examples, the text-analysis operation 1720 can generate a pseudo-document or another data structure that contains one or more text strings by concatenating together the possible categorical values of the input data 1602. For example, the text-analysis operation can generate a data structure that includes a space-separate text string in which each textual value for each variable, across some or all observations (e.g., transactions) for a unique subject in the input data 1602, are concatenated together. This process may be repeated for each unique subject in the input data 1602, such that there are N data structures if there are N unique subjects. Concatenating the structured text together into a data structure may allow the structured text to be treated as if it is unstructured text, so that textual analysis techniques (e.g., topic analysis, predictive rule generation from terms, etc.) typically reserved for unstructured text may be applied to the input data 1602. This may allow for a broader range of textual analysis techniques to be applied to the input data 1602.

Additionally or alternatively, the text-analysis operation 1720 can generate a data structure indicating the number of observations for a unique subject in the input data 1602. This process may be repeated for each unique subject in the input data 1602, such that there are N data structures if there are N unique subjects.

At operation 1722, the processing device determines predictive rules are to be generated. The processing device may make this determination based on some or all of the features extracted in prior operations, such as operation 1702 or operation 1720. If the processing device determines that the predictive rules are not to be generated, the process 1700 can end. Otherwise, the processing device can add a predictive-rule generation operation 1724 into the pipeline 1610.

The predictive-rule generation operation 1724 can generate rules to predict levels of a target variable based on the presence or absence of a variable in the input data 1602 or in the text-analysis operation 1720. The levels can be numerical values or textual terms (e.g., in the case of categorical value converted into unstructured text). The predictive-rule generation operation 1724 can then add a new variable to the analysis table 1616 based on each rule generated. In this way, the predictive-rule generation operation 1724 can add information to the analysis table 1616 that was not originally present in the input data 1602.

It will be appreciated that the pipeline 1610 shown in FIG. 17 is intended to be illustrative and non-limiting. Other examples may include more, fewer, or different processing operations in the pipeline 1610. And other examples may include more, fewer, or different rules for incorporating processing operations into the pipeline 1610. In general, any suitable number and combination of processing operations can be incorporated into the pipeline 1610 based on any number and combination of rules.

After generating the pipeline 1610, the processing device can execute the pipeline 1610 (e.g., using the pipeline-creation software or the program code 1614) on the input data 1602. As the processing device performs the processing operations in the pipeline 1610, some or all of the processing operations can derive new information from the input data 1602 and incorporate the new information into the analysis table 1616. Since the new information is derived from the original input data 1602, the new information may be considered features of the input data 1602 and each such processing operation may be considered a feature-extraction operation.

As noted above, it may be desirable to determine how each of the processing operations in the pipeline 1610 influences the modelling result, so that the pipeline can be optimized. To that end, the processing device can determine the impact of each processing operation on the modelling result. In some examples, the processing device can dynamically (e.g., in real time) determine the impact of each processing operation in the pipeline 1610 on the modelling result as the pipeline 1610 is being executed, for example by running a model-accuracy test 1708 after some or all of the processing operations are performed. This is represented in FIG. 17 by the model-accuracy tests 1708*b-e*. Each of the model-accuracy tests 1708*b-e* can indicate if the modelling result is improved by the corresponding processing operation. That information may then be output to the user, so that the user can improve the pipeline 1610. Additionally or alternatively, that information can be automatically acted upon by the processing device to automatically improve (e.g., optimize) the pipeline 1610. For example, the processing device may automatically remove harmful processing operations or extraneous processing operations from the pipeline 1610, which can improve the modelling result and/or reduce the amount of computing resources that are consumed by executing the pipeline 1610.

Figure 18:
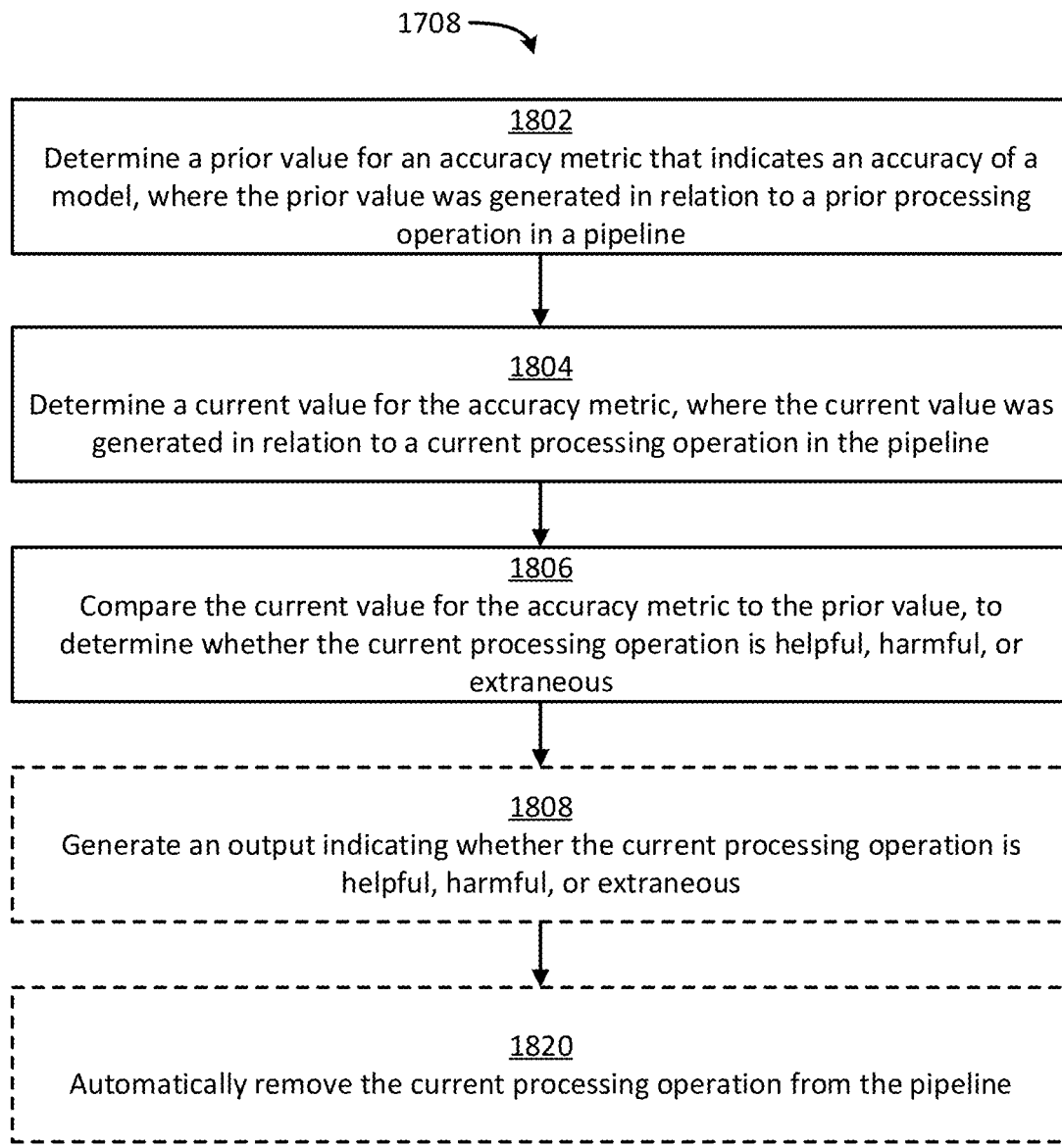
FIG. 18 depicts a flow chart of an example of a process for implementing a model-accuracy test according to some aspects of the present disclosure.

In some examples, the model-accuracy test 1708 can involve the operations shown in FIG. 18. Other examples may involve more operations, fewer operations, different operations, or a different order of the operations shown in FIG. 18. The operations of FIG. 18 are described below with reference to the components of FIGS. 16-17 described above.

In operation 1802, the processing device determines a prior value for an accuracy metric. The accuracy metric indicates the accuracy of a target model 1618. Examples of the accuracy metric can include accuracy, area under the curve (AUC), Mean Squared Error (MSE), F1 statistic correlation, correlation, etc. The prior value may have been generated in relation to a prior processing operation in the pipeline 1610. For example, if the current processing operation in the pipeline 1610 is the text-analysis operation 1720, then the prior value may have been generated during the model-accuracy test 1708*c* associated with the frequency-rollup operation 1716, since the frequency-rollup operation 1716 precedes the text-analysis operation 1720 in the pipeline 1610 of FIG. 17.

In operation 1804, a processing device determines a current value for the accuracy metric. The current value can be generated in relation to the current processing operation in the pipeline 1610. For example, if the current processing operation in the pipeline 1610 is the association-rule generation operation 1712, then the current value may have been generated in relation to the association-rule generation operation 1712.

In some examples, the processing device can generate the current value by supplying the analysis table 1616 as training data for training the target model 1618. Because the analysis table 1616 may be modified by some or all of the processing operations in the pipeline 1610, the analysis table 16161 may be different each time it is used to train the target model 1618 during one of the model-accuracy tests 1708. As a result, the value of the accuracy metric may change based on how each processing operation in the pipeline 1610 modifies the analysis table 1616.

In operation 1806, the processing device compares the current value for the accuracy metric to the prior value, to determine whether the current value is improved as compared to the prior value. For example, the processing device can compare the current value for a selected metric to the prior value for the selected metric to determine if there is a difference between the two. If so, the change can be attributed to the current processing operation. If the change increases the value of the selected metric, the processing device or the user can determine that current processing operation is a helpful processing operation that enhances the modelling result. If the change decreases the value of the selected metric, the processing device or the user can determine that current processing operation is a harmful processing operation that is detrimental the modelling result. If there is little or no change to the value of the selected metric, the processing device or the user can determine that the current processing operation is an extraneous processing operation.

In some examples, the processing device can execute optional operation 1808. In this operation, the processing device generates an output indicating whether the current processing operation is a helpful processing operation, a harmful processing operation, or an extraneous processing operation. In some examples, the processing device may incorporate the output into a GUI. For example, the GUI may color code a processing operation in the pipeline 1610 as green, red, or gray to indicate that the processing operation is a helpful processing operation, a harmful processing operation, or an extraneous processing operation, respectively. Of course, this color-coding scheme is intended to be exemplary and other color-coding schemes may also be used.

In some examples, the processing device can execute optional operation 1820. In this operation, the processing device automatically removes the current processing operation from the pipeline 1610. In some examples, the processing device can automatically remove the current processing operation if the current processing operation is a harmful processing operation or an extraneous operation. In other examples, the processing device can automatically remove the current processing operation from the pipeline 1610 if the current processing operation is a helpful processing operation. For example, the processing device can determine that the modelling improvement afforded by the helpful processing operation is outweighed by the amount of computing resources consumed by the help processing operation. So, the processing device can remove the helpful processing operation from the pipeline 1610.

Figure 19:
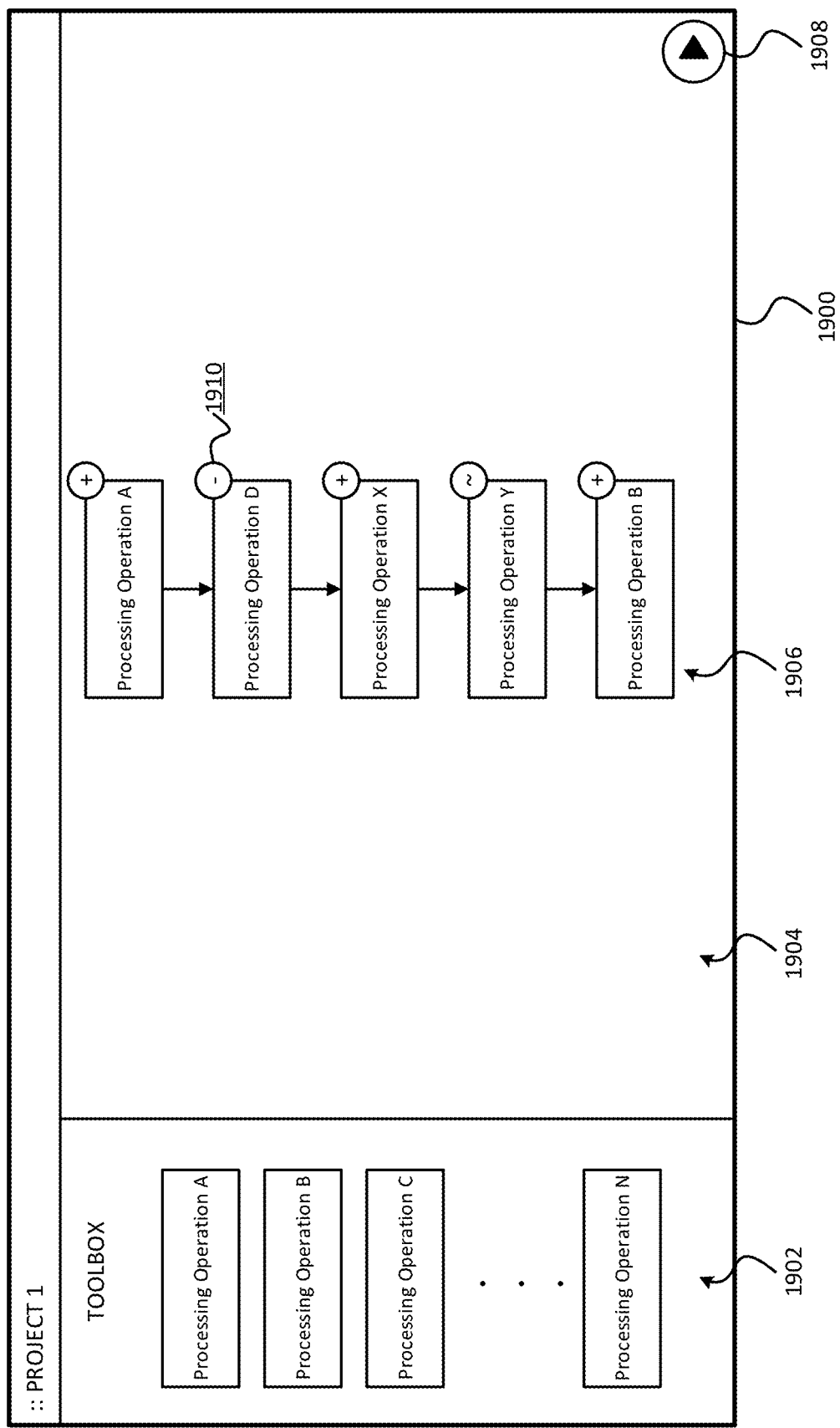
FIG. 19 depicts an example of a graphical user interface according to some aspects of the present disclosure.

FIG. 19 depicts an example of a GUI 1900 configured to assist in generating pipelines according to some aspects of the present disclosure. In this example, the GUI 1900 includes a frame 1902 with a toolbox of N processing operations (e.g., Processing Operations A-N) that may be included in a pipeline 1906. A use can manually drag-and-drop the processing operations into a canvas region 1904 and arrange them in a desired order to create the pipeline 1906. Additionally, or alternatively, a processing device can automatically select processing operations from the toolbox and organize the selected processing operations to create at least a portion of the pipeline 1906, which may then be further customized by the user. For example, the user may add additional processing operations into the automatically generated pipeline, remove existing operations from the automatically generated pipeline, or change the order of the processing operations in the automatically generated pipeline. Once the user is satisfied with the pipeline 1906, the user can select a play button 1908 to execute the pipeline 1906 on any set of input data, in order to generate an analysis table for use in a modelling process.

In some examples, the processing device can execute a model-accuracy test with respect to each processing operation in the pipeline 1906. The processing device can then update the GUI 1900 to reflect the results of the model-accuracy tests. The GUI 1900 can indicate the results of the model-accuracy tests with status indicators, such as status indicator 1910. The status indicator for a given processing operation can specify whether the processing operation is a helpful processing operation, a harmful processing operation, or an extraneous processing operation. In the example shown in FIG. 19, helpful processing operations are indicated by a "+" symbol, harmful processing operations are indicated by a "−" symbol, and extraneous processing operations are indicated by a "~" symbol. But other examples may use other schemes such as a color coding to delineate between helpful, harmful, and extraneous processing operations. For example, the GUI 1900 could use a color scheme in which the status indicators are colored red to represent a harmful processing operation, green to represent a helpful processing operation, or gray to represent an extraneous processing operation.

A user can view the status indicators and adjust the pipeline 1906 accordingly. For example, the user may remove Processing Operation D from the pipeline 1906 upon determining that Processing Operation D is a harmful processing operation. Additionally, or alternatively, the user may remove Processing Operation Y from the pipeline 1906 upon determining that Processing Operation Y is an extraneous processing operation. Once the user has made any desired changes to the pipeline 1906, the user may select the play button 1908 again to execute the updated pipeline on input data to generate an updated version of the analysis table.

It will be appreciated that the FIG. 19 is intended to be illustrative and non-limiting. Other examples may include more components, fewer components, different components, or a different arrangement of the components shown in FIG. 19. Additionally, the graphical objects shown in FIG. 19 may have different shapes, sizes, colors, icons, and locations in other examples. For instance, although the status indicator (e.g., status indicator 1910) for each processing operation is shown in a particular position relative to the processing operation in FIG. 19, in other examples the status indicators can be in other locations of the GUI 1900. And although the status indicators are shown as having a circular shape in FIG. 19, in other examples the status indicators may have other shapes and sizes.

Figure 20:
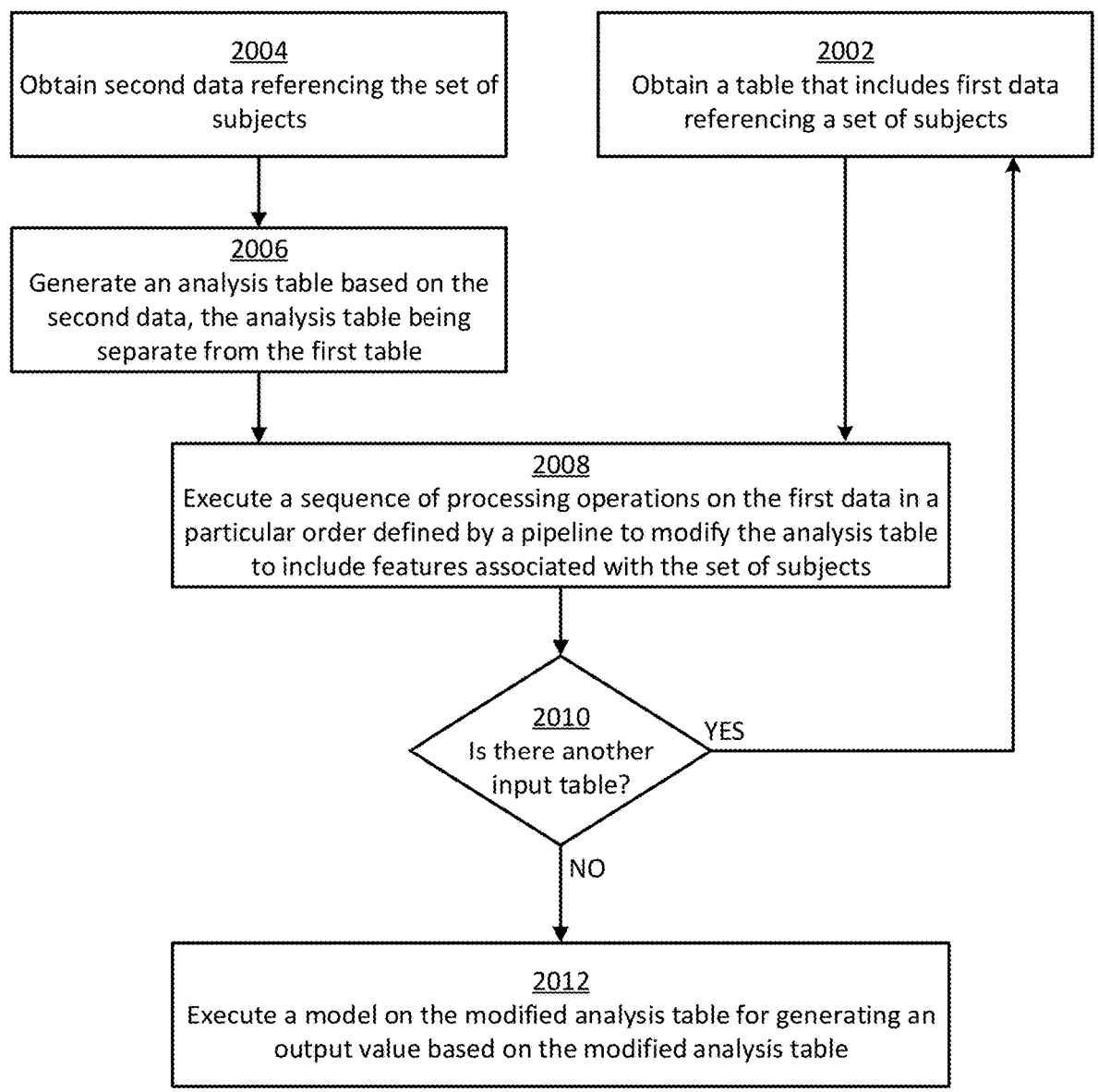
FIG. 20 depicts a flow chart of an example of a process for generating a pipeline according to some aspects of the present disclosure.

FIG. 20 depicts a flow chart of an example of a process for generating a pipeline according to some aspects of the present disclosure. Other examples may involve more operations, fewer operations, different operations, or a different order of the operations shown in FIG. 20.

In operation 2002, a processing device obtains a first table that includes first data (e.g., transactional data) referencing a set of subjects. Obtaining the first table may involve receiving or generating the first table. The first data may be considered part of the input data 1602 of FIG. 16.

In the first data, each subject in the set of subjects can be correlated to one or more variable values describing a transaction associated with the subject. The first data can include at least one one-to-many relationships, in which a single subject in the set of subjects is reference in multiple observations. The one-to-many relationship(s) in the first data may be incompatible with a target model.

In operation 2004, the processing device obtains second data (e.g., subject data) referencing the set of subjects. The second data can be separate from the first data. For example, the second data may be part of a second table that is separate from the first table.

Obtaining the second data may involve receiving or generating the second data. For example, the second data may be generated (e.g., inferred or derived) based on the first data by extracting the set of subjects from the first table. The second data may be considered part of the input data 1602 of FIG. 16.

In the second data, each subject in the set of subjects can be correlated to one or more attributes describing the subject. The second table may be key-linked to the first table by the set of subjects.

In operation 2006, the processing device generates an analysis table based on the second data. For example, the processing device can generate an analysis table that includes some or all of the subject data in the second table. In some examples, the analysis table may be separate from the first table and the second table. Alternatively, the processing device can use the second table as the analysis table, rather than copying information from the second table into a separate analysis table.

In operation 2008, the processing device executes a sequence of processing operations on the first data in a particular order defined by a pipeline to modify the analysis table to include features associated with the set of subjects. In some examples, the pipeline can be a least partially defined by a user. Additionally, or alternatively, the pipeline can be at least partially defined by a computer automatically. Each of the processing operations in the pipeline can be configured to modify the analysis table by adding data to the analysis table or removing data from the analysis table.

The pipeline can include any number and combination of processing operations. In some examples, each processing operation in the sequence can be configured to determine a respective set of features based on the first data by executing a respective feature-extraction operation on the first data. The respective set of features can then be added to the analysis table, for example so that each subject in the set of subjects is correlated in the analysis table to corresponding values for the respective set of features.

In some examples, the analysis table may lack the one-to-many relationships in the first data, with which a target model may be incompatible, thereby reducing potential compatibility issues. Additionally, the analysis table may have less information than the first data and may have information that is more relevant to the target model than the first data. This can allow the analysis table to be consumed faster than, and render more accurate results than, the first data. As a result, the analysis table may be more fit for consumption by the target model than the first data.

In operation 2010, the processing device determines if there is an additional input table (e.g., transaction table) for use by the pipeline. If so, the process can return to operation 2002 and the process can repeat, for example to further expand the analysis table with additional information. In such circumstances, the additional input table would serve as the "table" in operation 2002 and the data therein would serve as the "first data" in operation 2002. This process can iterate any number of times, for example until there are no more input tables to be operated upon.

In operation 2012, the processing device executes the target model on the modified analysis table for generating an output value based on the modified analysis table. An example of the target model can be a predictive model and an example of the output value can be a predicted value. The predictive model may be, for example, a machine-learning model configured to predict demand for a hardware or software product, a number of visits to a website, a potential adverse reaction to a vaccination, product demand data, a number of secure connections to a network, etc.

Although the above operations are described with respect to two data tables, a similar process can be applied to any number and combination of tables (e.g., one or four tables). For example, a similar process may be applied in an embodiment that involves the first table and excludes the second table, whereby the second data may be derived from the first data of the first table. As one such example, the processing device may derive subject data from the transactional data in the first table. In other examples, a similar process can be applied to three or more tables, where each table can be used to add additional data to the analysis table.

Additionally, although various examples are described herein with respect to an analysis table, similar principles can be applied to any other suitable type of data structure. Thus, the principles described herein are not intended to be limited to analysis tables or data tables.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processing devices; and
one or more memory devices including instructions that are executable by the one or more processing devices for causing the one or more processing devices to:
obtain a first table that includes first data referencing a set of subjects, wherein each subject in the set of subjects is correlated in the first data to one or more variable values describing a transaction associated with the subject, and wherein the first data includes at least one one-to-many relationship in which a subject in the set of subjects is referenced in multiple observations;
obtain second data referencing the set of subjects, wherein each subject in the set of subjects is correlated in the second data to one or more attributes describing the subject;
generate an analysis table based on the second data, the analysis table being separate from the first table;
execute a sequence of processing operations on the first data in a particular order defined by a data-processing pipeline to modify the analysis table to include features associated with the set of subjects, wherein executing each respective processing operation in the sequence to generate the modified analysis table involves:
deriving a respective set of features from the first data by executing a respective feature-extraction operation on the first data; and
adding the respective set of features to the analysis table, such that each subject in the set of subjects is correlated in the analysis table to corresponding values for the respective set of features; and
execute a predictive model on the modified analysis table for generating a predicted value based on the modified analysis table.

2. The system of claim 1, wherein executing each respective processing operation in the sequence further involves performing a model-accuracy test comprising:
determining a current value for an accuracy metric that indicates an accuracy of the predictive model, the current value being determined by providing the modified analysis table as input to the predictive model;
comparing the current value for the accuracy metric to a prior value for the accuracy metric that was generated in relation to a prior processing operation in the sequence, to determine whether the current value is improved as compared to the prior value; and
generating an output indicating whether the current value is improved as compared to the prior value.

3. The system of claim 2, wherein the one or more memory devices further include instructions that are executable by the one or more processing devices for causing the one or more processing devices to:
generate a graphical user interface (GUI) indicating whether each processing operation in the sequence increased the accuracy of the predictive model.

4. The system of claim 3, wherein the GUI indicates that a particular processing operation in the sequence of processing operations did not improve the accuracy of the predictive model, and wherein the one or more memory devices further include instructions that are executable by the one or more processing devices for causing the one or more processing devices to:
receive a user input for removing the particular processing operation from the data-processing pipeline;
in response to the user input, update the data-processing pipeline to remove the particular processing operation; and
execute the updated data-processing pipeline on the first data to generate an updated version of the modified analysis table for use with the predictive model.

5. The system of claim 1, wherein the one or more memory devices further include instructions that are executable by the one or more processing devices for causing the one or more processing devices to automatically generate the data-processing pipeline by:
automatically selecting the processing operations from among a group of processing operations based on a plurality of characteristics of the first data; and automatically arranging the processing operations in the particular order based on the plurality of characteristics.

6. The system of claim 1, wherein the one or more memory devices further include pipeline-creation software that is executable by the one or more processing devices for causing the one or more processing devices to generate a graphical user interface (GUI) that includes an extensible toolbox of feature-extraction operations that are selectable and arrangeable by a user to create data-processing pipelines, the data-processing pipelines being configured to apply feature-extraction operations on input data to generate analysis tables.

7. The system of claim 1, wherein executing at least one processing operation in the sequence involves:
concatenating the first data together into a text string; and
performing the respective feature-extraction operation on the text string.

8. The system of claim 1, wherein the predictive model is a trained machine-learning model.

9. The system of claim 1, wherein the one or more memory devices include pipeline-creation software that is executable by the one or more processing devices for causing the one or more processing devices to automatically generate program code based on the data-processing pipeline, the program code being configured to be executed independently of the pipeline-creation software for performing the sequence of processing operations faster than executing the data-processing pipeline in pipeline-creation software.

10. The system of claim 9, wherein the one or more memory devices further include instructions that are executable by the one or more processing devices for causing the one or more processing devices to automatically generate the program code based on the data-processing pipeline by, for each processing operation in the sequence:
selecting a code template, from among a plurality of code templates, that is associated with the processing operation;
modifying the selected code template based on a set of parameters; and
incorporating the modified code template into the program code.

11. The system of claim 9, wherein the one or more memory devices further include instructions that are executable by the one or more processing devices for causing the one or more processing devices to execute a plurality of iterations of the data-processing pipeline on a plurality of data tables, wherein each iteration of the plurality of iterations involves executing the sequence of processing operations in the data-processing pipeline on respective set of data from a respective data table among the plurality of data tables to expand the analysis table.

12. A method comprising:
obtaining, by one or more processing devices, a first table that includes first data referencing a set of subjects, wherein each subject in the set of subjects is correlated in the first data to one or more variable values describing a transaction associated with the subject, and wherein the first data includes at least one one-to-many relationship in which a subject in the set of subjects is referenced in multiple observations;
obtaining, by the one or more processing devices, second data referencing the set of subjects, wherein each subject in the set of subjects is correlated in the second data to one or more attributes describing the subject;
generating, by the one or more processing devices, an analysis table based on the second data, the analysis table being separate from the first table;
executing, by the one or more processing devices, a sequence of processing operations on the first data in a particular order defined by a data-processing pipeline to modify the analysis table to include features associated with the set of subjects, wherein executing each respective processing operation in the sequence to generate the modified analysis table involves:
deriving a respective set of features from the first data by executing a respective feature-extraction operation on the first data; and
adding the respective set of features to the analysis table, such that each subject in the set of subjects is correlated in the analysis table to corresponding values for the respective set of features; and
executing, by the one or more processing devices, a predictive model on the modified analysis table for generating a predicted value based on the modified analysis table.

13. The method of claim 12, wherein executing each respective processing operation in the sequence further involves performing a model-accuracy test comprising:
determining a current value for an accuracy metric that indicates an accuracy of the predictive model, the current value being determined by providing the modified analysis table as input to the predictive model;
comparing the current value for the accuracy metric to a prior value for the accuracy metric that was generated in relation to a prior processing operation in the sequence, to determine whether the current value is improved as compared to the prior value; and
generating an output indicating whether the current value is improved as compared to the prior value.

14. The method of claim 13, further comprising:
generating a graphical user interface (GUI) indicating whether each processing operation in the sequence increased the accuracy of the predictive model.

15. The method of claim 14, wherein the GUI indicates that a particular processing operation in the sequence of processing operations did not improve the accuracy of the predictive model, and further comprising:
receiving a user input for removing the particular processing operation from the data-processing pipeline;
in response to the user input, updating the data-processing pipeline to remove the particular processing operation; and
executing the updated data-processing pipeline on the first data to generate an updated version of the modified analysis table for use with the predictive model.

16. The method of claim 12, further comprising automatically generating the data-processing pipeline by:
automatically selecting the processing operations from among a group of processing operations based on a plurality of characteristics of the first data; and
automatically arranging the processing operations in the particular order based on the plurality of characteristics.

17. The method of claim 12, further comprising executing pipeline-creation software to generate a graphical user interface (GUI) that includes an extensible toolbox of feature-extraction operations that are selectable and arrangeable by a user to create data-processing pipelines, the data-processing pipelines being configured to apply feature-extraction operations on input data to generate analysis tables.

18. The method of claim 12, wherein executing at least one processing operation in the sequence involves:
concatenating the first data together into a text string; and
performing the respective feature-extraction operation on the text string.

19. The method of claim 12, wherein the predictive model is a trained machine-learning model.

20. The method of claim 12, further comprising executing pipeline-creation software to automatically generate program code based on the data-processing pipeline, the program code being configured to be executed independently of the pipeline-creation software for performing the sequence of processing operations faster than executing the data-processing pipeline in pipeline-creation software.

21. The method of claim 20, further comprising automatically generating the program code based on the data-processing pipeline by, for each processing operation in the sequence:
selecting a code template, from among a plurality of code templates, that is associated with the processing operation;
modifying the selected code template based on a set of parameters; and
incorporating the modified code template into the program code.

22. The method of claim 12, further comprising executing a plurality of iterations of the data-processing pipeline on a plurality of data tables, wherein each iteration of the plurality of iterations involves executing the sequence of processing operations in the data-processing pipeline on respective set of data from a respective data table among the plurality of data tables to expand the analysis table.

23. A non-transitory computer-readable medium comprising program code that is executable by one or more processing devices for causing the one or more processing devices to:
obtain a first table that includes first data referencing a set of subjects, wherein each subject in the set of subjects is correlated in the first data to one or more variable values describing a transaction associated with the subject, and wherein the first data includes at least one one-to-many relationship in which a subject in the set of subjects is referenced in multiple observations;
obtain second data referencing the set of subjects, wherein each subject in the set of subjects is correlated in the second data to one or more attributes describing the subject;
generate an analysis table based on the second data, the analysis table being separate from the first table;
execute a sequence of processing operations on the first data in a particular order defined by a data-processing pipeline to modify the analysis table to include features associated with the set of subjects, wherein executing each respective processing operation in the sequence to generate the modified analysis table involves:
deriving a respective set of features from the first data by executing a respective feature-extraction operation on the first data; and
adding the respective set of features to the analysis table, such that each subject in the set of subjects is correlated in the analysis table to corresponding values for the respective set of features; and
execute a predictive model on the modified analysis table for generating a predicted value based on the modified analysis table.

24. The non-transitory computer-readable medium of claim 23, wherein executing each respective processing operation in the sequence further involves performing a model-accuracy test comprising:
determining a current value for an accuracy metric that indicates an accuracy of the predictive model, the current value being determined by providing the modified analysis table as input to the predictive model;
comparing the current value for the accuracy metric to a prior value for the accuracy metric that was generated in relation to a prior processing operation in the sequence, to determine whether the current value is improved as compared to the prior value; and
generating an output indicating whether the current value is improved as compared to the prior value.

25. The non-transitory computer-readable medium of claim 24, further comprising program code that is executable by the one or more processing devices for causing the one or more processing devices to:
generate a graphical user interface indicating that a particular processing operation in the sequence of processing operations did not improve the accuracy of the predictive model;
receive a user input for removing the particular processing operation from the data-processing pipeline;
in response to the user input, update the data-processing pipeline to remove the particular processing operation; and
execute the updated data-processing pipeline on the first data to generate an updated version of the modified analysis table for use with the predictive model.

26. The non-transitory computer-readable medium of claim 23, further comprising program code that is executable by the one or more processing devices for causing the one or more processing devices to automatically generate the data-processing pipeline by:
automatically selecting the processing operations from among a group of processing operations based on a plurality of characteristics of the first data; and
automatically arranging the processing operations in the particular order based on the plurality of characteristics.

27. The non-transitory computer-readable medium of claim 23, further comprising pipeline-creation software that is executable by the one or more processing devices for causing the one or more processing devices to generate a graphical user interface (GUI) that includes an extensible toolbox of feature-extraction operations that are selectable and arrangeable by a user to create data-processing pipelines, the data-processing pipelines being configured to apply feature-extraction operations on input data to generate analysis tables.

28. The non-transitory computer-readable medium of claim 23, wherein executing at least one processing operation in the sequence involves:
concatenating the first data together into a text string; and
performing the respective feature-extraction operation on the text string.

29. The non-transitory computer-readable medium of claim 23, further comprising pipeline-creation software that is executable by the one or more processing devices for causing the one or more processing devices to automatically generate program code based on the data-processing pipeline, the program code being configured to be executed independently of the pipeline-creation software for performing the sequence of processing operations faster than executing the data-processing pipeline in pipeline-creation software.

30. The non-transitory computer-readable medium of claim 29, further comprising program code that is executable by the one or more processing devices for causing the one or more processing devices to automatically generate the program code based on the data-processing pipeline by, for each processing operation in the sequence:
- selecting a code template, from among a plurality of code templates, that is associated with the processing operation;
- modifying the selected code template based on a set of parameters; and
- incorporating the modified code template into the program code.

* * * * *